(12) United States Patent
Sakaguchi et al.

(10) Patent No.: US 8,518,540 B2
(45) Date of Patent: Aug. 27, 2013

(54) EXPANDED POLYPROPYLENE RESIN BEADS AND EXPANDED BEAD MOLDING

(75) Inventors: Masakazu Sakaguchi, Yokkaichi (JP);
Kouki Nishijima, Yokkaichi (JP);
Masaharu Oikawa, Yokkaichi (JP)

(73) Assignee: JSP Corporation, Tokyo (JP)

( * ) Notice: Subject to any disclaimer, the term of this patent is extended or adjusted under 35 U.S.C. 154(b) by 0 days.

(21) Appl. No.: 13/379,430

(22) PCT Filed: Jun. 3, 2010

(86) PCT No.: PCT/JP2010/003699
§ 371 (c)(1),
(2), (4) Date: Dec. 20, 2011

(87) PCT Pub. No.: WO2010/150466
PCT Pub. Date: Dec. 29, 2010

(65) Prior Publication Data
US 2012/0100376 A1   Apr. 26, 2012

(30) Foreign Application Priority Data
Jun. 26, 2009   (JP) .................................. 2009-153033

(51) Int. Cl.
*B32B 5/16* (2006.01)

(52) U.S. Cl.
USPC ........... 428/403; 428/404; 428/405; 428/406; 428/407; 427/212; 521/56; 521/60

(58) Field of Classification Search
USPC .................. 428/403–407; 427/212; 521/56, 521/60
See application file for complete search history.

(56) References Cited

U.S. PATENT DOCUMENTS

| | | | | |
|---|---|---|---|---|
| 5,474,841 A | * | 12/1995 | Matsuki et al. | ............ 428/304.4 |
| 5,928,776 A | | 7/1999 | Shioya et al. | |
| 6,033,770 A | * | 3/2000 | Matsuki et al. | ............ 428/309.9 |
| 6,077,875 A | * | 6/2000 | Sasaki et al. | .................... 521/60 |
| 6,096,417 A | | 8/2000 | Shioya et al. | |
| 6,133,331 A | * | 10/2000 | Oikawa et al. | .................. 521/60 |
| 6,313,184 B1 | * | 11/2001 | Sasaki et al. | .................... 521/56 |
| 8,129,438 B2 | * | 3/2012 | Nohara et al. | .................. 521/56 |

FOREIGN PATENT DOCUMENTS

| | | |
|---|---|---|
| EP | 0 477 476 B1 | 2/1996 |
| JP | A-58-145739 | 8/1983 |
| JP | A-59-127714 | 7/1984 |
| JP | A-04-372630 | 12/1992 |
| JP | A-07-137063 | 5/1995 |
| JP | A-09-104026 | 4/1997 |
| JP | A-09-104027 | 4/1997 |
| JP | A-10-077359 | 3/1998 |
| JP | A-10-180888 | 7/1998 |
| JP | B2-3092227 | 9/2000 |
| JP | A-2003-266468 | 9/2003 |
| JP | 2004-27196  * | 1/2004 |
| JP | A-2004-027196 | 1/2004 |
| JP | A-2004-068016 | 3/2004 |
| JP | 2005-139350  * | 6/2005 |
| JP | A-2005-139350 | 6/2005 |
| JP | A-2005-325179 | 11/2005 |
| WO | WO 98/00287 A1 | 1/1998 |
| WO | WO 98/34770 A1 | 8/1998 |

OTHER PUBLICATIONS

International Search Report issued in International Application No. PCT/JP2010/003699 dated Sep. 21, 2010.
Translation of Written Opinion issued in International Application No. PCT/JP2010/003699 dated Sep. 21, 2010.
International Search Report dated Sep. 21, 2010 in International Application No. PCT/JP2010/003699 (with translation).

* cited by examiner

*Primary Examiner* — Leszek Kiliman
(74) *Attorney, Agent, or Firm* — Oliff & Berridge, PLC

(57) ABSTRACT

Multilayer expanded polypropylene resin beads that are heat moldable at low steam pressure and can provide an expanded mold with sufficient rigidity and heat resistance. The beads are formed from a polypropylene resin and a coating layer formed from a different polypropylene resin. The multilayer expanded resin beads can be molded in-mold at a steam pressure lower than the steam pressure for molding single-layer expanded beads made from the polypropylene resin which forms the core layer. The coating layer to core layer resin weight ratio in the multi-layer resin beads is not less than 0.001 and not greater than 0.040 and the expansion ratio of the expanded beads, the average value of the thickness of the coating layer of the expanded beads, calculated based on the coating weight ratio of the multi-layer resin beads, is not less than 0.1 μm and not greater than 3.0 μm.

13 Claims, 5 Drawing Sheets

EXPANDED POLYPROPYLENE RESIN BEADS AND EXPANDED BEAD MOLDING

TECHNICAL FIELD

The present invention relates to expanded polypropylene resin beads, and a foamed molded article formed from the same expanded beads.

BACKGROUND ART

In recent years, the fields of applications of polypropylene resins are growing widely because the polypropylene resins achieve an excellent balance among mechanical strength, heat resistance, processability and price, and also have excellent properties such as easy incinerability and easy recyclability.

Similarly, expanded beads-molded articles formed from uncrosslinked polypropylene resin beads are extensively used as packaging materials, construction materials, heat insulating materials and the like, since the expanded beads-molded articles are imparted with characteristics such as shock absorbing properties and heat insulation properties, without impairing the excellent property of polypropylene resins.

In recent years, the expanded beads-molded articles formed from uncrosslinked polypropylene resin beads are demaded to be lightweight and high-rigidity, particularly in the field of automobiles. Thus, investigations have been conducted on the use of high rigidity polypropylene resins as the base resin of expanded beads. High rigidity polypropylene resins tend to have higher melting points as rigidity increases. Therefore, in order to in-mold molding expanded beads formed of a high-rigidity polypropylene resin as a base resin, high steam pressure is required. Particularly, when the melting point of a polypropylene resin is 145° C. or higher, the steam pressure required for in-mold molding exceeds the pressure-resistant performance of conventional molding machines. Accordingly, when conventional molding machines are used, it is difficult to apply a sufficient steam pressure, and only those molded articles in which the fuse-bonding between expanded beads is insufficient, could be obtained. Therefore, in order to perform in-mold molding of high-rigidity expanded polypropylene resin beads having a melting point of 145° C. or higher, a special molding apparatus which is capable of enduring high steam pressure is needed. Furthermore, in the case of expanded beads formed of a high-rigidity polypropylene resin, there has been a problem that an enormous amount of steam is required for the use during molding.

Extensive investigations have been conducted in relation to expanded polypropylene resin beads so as to address such problems and to obtain an expanded beads-molded article capable of being molded within the range of the pressure-resistant performance of conventional molding apparatuses. For example, first, Patent Literature 1 has suggested expanded polypropylene resin beads which are formed from a particulate foam of a first polypropylene resin having a melting point of 140° C. or higher, and a foam of a second polypropylene resin closely adhering to the surface of the particulate foam, in which the melting point of the second polypropylene resin is lower by 2° C. to 10° C. than the melting point of the first polypropylene resin, and the second polypropylene resin has a specific surface area. However, although the expanded beads can be molded at a low steam pressure, the coating layer portion which corresponds to the second polypropylene resin expands and bursts during in-mold molding, the rigidity such as compressive strength of the resulting expanded beads-molded article is low.

Furthermore, Patent Literature 2 has suggested expanded beads which are each composed of a core layer that is formed from a crystalline thermoplastic resin and is in an expanded state, and a coating layer that is formed from an ethylene polymer having a lower melting point than the thermoplastic resin and is substantially in an unexpanded state. However, a molded article obtained by using the expanded beads has a problem that heat resistance is low, as proved by low flexural properties under heating conditions.

The Applicant of the present application intended to provide expanded polypropylene resin beads, with which an expanded beads-molded article having rigidity and heat resistance can be obtained, as described in Patent Literature 3, and defined the upper limit of the thickness of the coating layer in the resin beads. However, although the expanded beads can be molded at a low steam pressure, it is necessary to set the calorific value of the high-temperature peak of the expanded beads to be large, in order to increase rigidity such as compressive strength of the resulting expanded beads-molded article. As a result, since the secondary expanding power at the time of heat molding is insufficient, a so-called pressure molding method by which in-mold molding is carried out while a high internal pressure is applied to the expanded beads, may be necessary in order to make up for the insufficient expanding power, or the appearance of the resulting expanded beads-molded article may have many voids.

On the other hand, the Applicant of the present application has suggested a shock absorbing material having excellent rigidity such as compressive strength, which is formed by in-mold molding expanded beads having a modified surface capable of low temperature molding, as described in Patent Literature 4. However, there still are problems to be addressed for an improvement, such as the effluent treatment of organic peroxides used at the time of surface modification, and there is also a demand for a substitute.

CITATION LIST

Patent Literature

Patent Literature 1: Japanese Patent Application Laid-Open (JP-A) No. 58-145739
Patent Literature 2: JP-A No. 10-77359
Patent Literature 3: JP-A No. 2004-68016
Patent Literature 4: JP-A No. 2004-27196

DISCLOSURE OF THE INVENTION

Problem to be Solved by the Invention

It is an object of the present invention to provide expanded polypropylene resin beads which can be heat molded at a steam pressure that is lower than the steam pressure required for the heat molding of conventional expanded polypropylene resin beads, even without any surface modification of the beads using an organic peroxide, and which can provide an expanded beads-molded article having sufficient rigidity and excellent heat resistance, even without setting the calorific value of the high-temperature peak of the expanded beads to be large, or without employing a pressure molding method.

Means for Solving the Problem

The inventors of the present invention conducted thorough investigations in order to solve the problems described above. As a result, the inventors found that in regard to expanded beads which are each composed of a core layer formed of a polypropylene resin and a coating layer formed of a polypropylene resin different from the polypropylene resin forming the core layer, wherein in such an expanded bead, the polypropylene resin forming the coating layer is substantially covered with an unexpanded coating layer portion including the coating layer, which is obtained by selecting a resin having excellent thermal adhesiveness such as having a melting point lower than that of the polypropylene resin forming the core layer, impregnating a blowing agent into multilayer resin beads with the weight ratio of the coating layer in the resin beads being adjusted to a specific value, and expanding the multilayer resin beads that contain a blowing agent and are in a heated and softened state, and wherein the expanded beads can be fused with each other at a low steam pressure, when the thickness of the coating layer portion of the expanded beads is in a certain specific range, the properties inherent to the polypropylene resin of the core layer, such as rigidity, are sufficiently exhibited. Thus, the inventors finally completed the present invention.

That is, the present invention relates to the following multilayer expanded polypropylene resin beads and an in-mold molded article of the expanded beads. In the present specification, the "multilayer expanded polypropylene resin beads" may be described simply as "multilayer expanded beads" or "expanded beads."

[1] The present invention relates to expanded polypropylene resin beads which are multilayer expanded beads that are formed by foaming and expanding multilayer resin beads each composed of a core layer formed of a polypropylene resin and a coating layer formed of a polypropylene resin that is different from the polypropylene resin forming the core layer, and can be in-mold molded at a steam pressure lower than the molding steam pressure of equivalent single-layer expanded beads formed by foaming and expanding single-layer resin beads formed from the polypropylene resin forming the core layer, wherein the weight ratio of the resins of the coating layer and the core layer forming the multilayer resin beads (weight of the coating layer resin/weight of the core layer resin) is from 0.001 to 0.040, and the average value of the thickness of the coating layer portion of the expanded beads is from 0.1 μm to 3.0 μm.

[2] It is preferable that the tensile modulus of the polypropylene resin forming the core layer in the multilayer resin beads, be 1000 MPa or greater.

[3] It is preferable that the tensile modulus of the polypropylene resin forming the core layer in the multilayer resin beads, be 1200 MPa or greater.

[4] It is preferable that the melting point of the polypropylene resin forming the coating layer of the multilayer resin beads be lower than the melting point of the polypropylene resin forming the core layer.

[5] It is preferable that the melting initiation temperature of the polypropylene resin forming the coating layer of the multilayer resin beads be lower than the melting initiation temperature of the polypropylene resin forming the core layer.

[6] It is preferable that the heat quantity of melting of the polypropylene resin forming the core layer of the multilayer resin beads be smaller than the heat quantity of melting of the polypropylene resin forming the core layer.

[7] It is preferable that the tensile yield strength of the polypropylene resin forming the core layer of the multilayer resin beads be at least 31 MPa.

[8] It is preferable that the polypropylene resin forming the core layer of the multilayer resin beads be one or a mixture of two or more selected from a propylene homopolymer, and a copolymer of propylene and another co-monomer containing 60 mol % or more of a propylene component unit.

[9] It is preferable that the DSC endothermic curve obtained by a heat flux differential scanning calorimetric analysis of the expanded polypropylene resin beads, exhibit an endothermic curve peak intrinsic to the polypropylene resin and an endothermic curve peak on a higher temperature side than the foregoing endothermic curve peak, and the calorific value of the endothermic curve peak on the higher temperature side be from 5 J/g to 40 J/g.

[10] It is preferable that the DSC endothermic curve obtained by a heat flux differential scanning calorimetric analysis of the expanded polypropylene resin beads, exhibit an endothermic curve peak intrinsic to the polypropylene resin and an endothermic curve peak on a higher temperature side than the foregoing endothermic curve peak, and the calorific value of the endothermic curve peak on the higher temperature side is from 15% to 70% of the sum of the calorific values of all the endothermic curve peaks.

[11] It is preferable that in a DSC endothermic curve obtained by a heat flux differential scanning calorimetric analysis of the polypropylene resin forming the core layer and the polypropylene resin forming the coating layer of a multilayer resin bead, the partial calorific value Ec (J/g) of the area under the temperature range of from the melting point (Ti) of the polypropylene resin forming the core layer to higher temperatures, and the partial calorific value Es (J/g) of the area under the temperature range of from the melting point (Ti) of the polypropylene resin forming the coating layer to higher temperatures, satisfy the following expressions (1) and (2):

$$0 < Es \leq 60 \quad (1)$$

$$0 < Es/Ec \leq 0.7 \quad (2)$$

[12] Furthermore, the present invention relates to an expanded polypropylene resin beads-molded article formed by filling the expanded polypropylene resin beads described in any one of the items [1] to [11] in a molding mold and heat molding the expanded beads.

Effect of the Invention

In regard to the multilayer expanded beads according to the present invention, upon filling expanded beads in a mold and performing molding, despite a polypropylene resin having a high melting point is used, the expanded beads can be sufficiently fuse-bonded with each other at a low steam pressure, and the multilayer expanded beads are covered with a coating layer portion having a specific thickness, the properties inherent to the polypropylene resin of the core layer, such as rigidity, can be sufficiently exhibited. Therefore, an expanded beads-molded article having sufficient rigidity can be obtained even without setting the calorific value of the high-temperature peak of the expanded beads to be high, or without employing a pressure molding method of performing in-mold molding by applying a high internal pressure to the expanded beads. Furthermore, an expanded beads-molded article having particularly excellent mechanical properties can be provided by setting, as desired, the calorific value of the high-temperature to be large, and employing a pressure molding method. Also, since the resin constituting the coating layer portion is a polypropylene resin, an expanded beads-molded article having excellent heat resistance can be provided.

Furthermore, the expanded beads of the present invention can provide an expanded beads-molded article, when the polypropylene resin forming the core layer has a specific value for the tensile modulus, which is suitable as an energy absorbing material such as a bumper, and exhibits excellent energy absorption and excellent compressive strength.

BEST MODES FOR CARRYING OUT THE INVENTION

Figure 1:
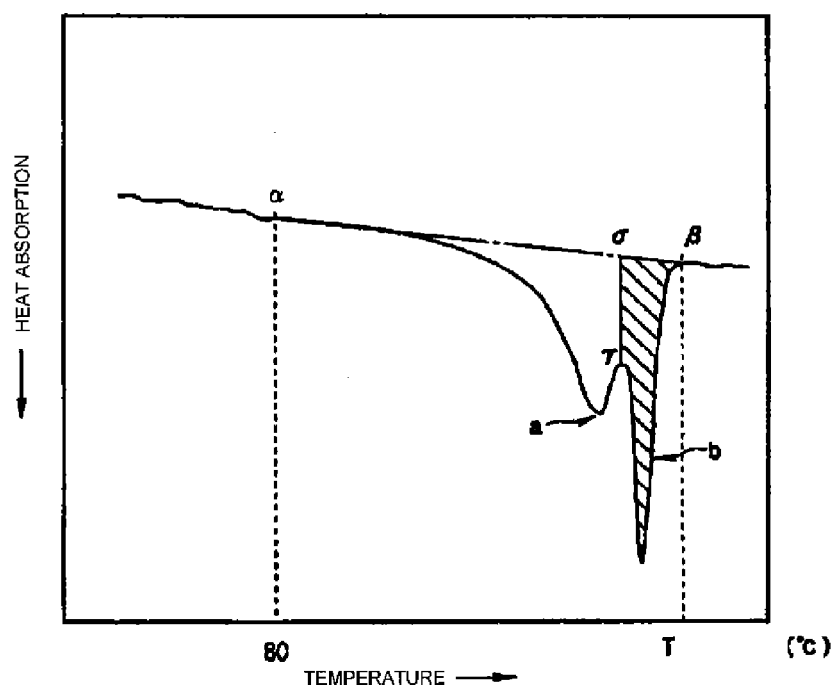
FIG. 1 shows an exemplary chart of a first time DSC endothermic curve of expanded polypropylene resin beads.

The expanded polypropylene resin beads according to the present invention are multilayer expanded beads obtained by impregnating a blowing agent into multilayer resin beads which are each composed of a core layer formed of a polypropylene resin and a coating layer formed of a polypropylene resin that is different from the core layer-forming polypropylene resin, and foaming and expanding the blowing agent-impregnated multilayer resin beads.

Here, the term "polypropylene resin that is different" means that at least any one of the melting point, melting initiation temperature, heat quantity of melting, temperature dependency of the heat quantity of melting, melt flow rate and Vicat softening temperature of such a resin is different. The values of the melting point, melting initiation temperature, heat quantity of melting and Vicat softening temperature described above are such that the values of the coating layer are smaller than the values of the core layer. Furthermore, the temperature dependency of the heat quantity of melting is such that the partial heat quantity of melting of the coating layer at or above a temperature equivalent to the melting point of the resin of the core layer is smaller than the partial heat quantity of melting of the core layer at or above the same temperature. Furthermore, the value of the melt flow rate is such that the value of the coating layer is larger than the value of the core layer.

The polypropylene resin forming the core layer of the multilayer resin beads of the present invention may be, for example, any one of a propylene homopolymer, and a copolymer of propylene and another co-monomer containing 60 mol % or more of a propylene component unit, and preferably 80 mol % or more of a propylene component unit, or may be a mixture of two or more kinds selected from these resins.

Examples of the copolymer of propylene and another co-monomer containing 60 mol % or more of a propylene component unit as described above include a propylene-ethylene random copolymer, a propylene-ethylene block copolymer, a propylene-butene random copolymer, and a propylene-ethylene-butene random copolymer.

The melting point of the polypropylene resin forming the core layer is preferably 135° C. to 170° C., and more preferably 145° C. to 170° C., from the viewpoint that the energy absorption of the resulting expanded beads-molded article against compressive deformation can be increased, and the expanded beads-molded article may have excellent mechanical strength.

Furthermore, the polypropylene resin forming the core layer is such that the tensile yield strength is preferably 31 MPa or greater, and more preferably 32 MPa or greater, from the viewpoint of making the compressive strength of the expanded beads-molded article large, and from the viewpoint that in the case of using the expanded beads-molded article as an energy absorbing material such as a bumper for automobiles, the energy absorption is excellent. The upper limit value of the tensile yield strength is usually no larger than 45 MPa.

The polypropylene resin of the core layer is such that the tensile elongation at break is preferably 20% or greater, more preferably 100% or greater, and even more preferably 200% to 1000%, from the viewpoint of preventing breakage of the cell wall when the multilayer resin beads are expanded, and from the viewpoint of preventing breakage of the cell wall when the expanded beads are heated during in-mold molding.

Here, the tensile yield strength and the tensile elongation at break are all values measured according to the measurement method described in JIS K 6785 (1981).

The polypropylene resin of the core layer according to the present invention is such that the tensile modulus is preferably at least 1000 MPa or greater, and more preferably 1100 MPa or greater, from the viewpoint of making the rigidity such as compressive strength of the expanded beads-molded article higher than that of conventional molded articles. When such a constitution is adopted, the resulting expanded beads-molded article can be imparted with excellent energy absorption. Particularly, in the case of using the expanded beads-molded article as an energy absorbing material such as a bumper, the tensile modulus is preferably 1200 MPa or greater, more preferably 1300 MPa or greater, and particularly preferably 1300 MPa to 2500 MPa.

Most of propylene homopolymers exhibit such high rigidity, and even in the case of copolymers of propylene and another co-monomer, such a copolymer having a very small content ratio of the co-monomer component tends to exhibit such high rigidity as described above.

The tensile modulus is a value that can be determined by measuring a resin based on JIS K 7161 (1994) under the following conditions.

Specimen: specimen type 1A described in JIS K 7162 (1994) (directly molded with an injection molding machine), tensile rate: 1 mm/min The polypropylene resin of the core layer is such that the melt flow rate (test condition 14 of JIS K 7210 (1976), which is abbreviated as MFR, is preferably from 1 g/10 min to 100 g/10 min, from the viewpoint of lowering the steam temperature at the time of in-mold molding, and from the viewpoint that the expanded beads-molded article has excellent toughness. From these viewpoints, the MFR is more preferably from 10 g/10 min to 70 g/10 min.

The polypropylene resin having both the tensile modulus and MFR in the ranges described above is available from polypropylene resins that are produced by various methods and are sold in the market.

In the polypropylene resin of the core layer, one kind or two or more kinds of a synthetic resin other than a polypropylene resin, a synthetic rubber and an elastomer can be appropriately added to the extent that the intended effects of the present invention are not impaired. The total amount of addition of the synthetic resin other than a polypropylene resin, a synthetic rubber and an elastomer is preferably 35 parts by weight or less, more preferably 20 parts by weight or less, even more preferably 10 parts by weight or less, and most preferably 5 parts by weight or less, for 100 parts by weight of the polypropylene resin.

Examples of the synthetic resin other than a polypropylene resin include polyethylene resins such as a high density polyethylene, a medium density polyethylene, a low density polyethylene, a linear low density polyethylene, a linear ultra low density polyethylene, an ethylene-vinyl acetate copolymer, an ethylene-acrylic acid copolymer, an ethylene-acrylic acid ester copolymer, an ethylene-methacrylic acid copolymer, and an ethylene-methacrylic acid ester copolymer; and polystyrene resins such as polystyrene, and a styrene-maleic anhydride copolymer.

Examples of the synthetic rubber include an ethylene-propylene rubber, an ethylene-1-butene rubber, a propylene-1-butene rubber, a styrene-butadiene rubber or a hydrogenation article thereof, an isoprene rubber, a neoprene rubber, and a nitrile rubber or the like. Examples of the elastomer include a styrene-butadiene-styrene block copolymer, a styrene-isoprene-styrene block copolymer, and hydrogenation articles thereof.

In addition, various additives can be incorporated into the polypropylene resin of the core layer if desired. Examples of these additives include an oxidation inhibitor, an ultraviolet inhibitor, an antistatic agent, a flame retardant, a metal inactivator, a pigment, a dye, a nucleating agent, and a cell control agent. Examples of the cell control agent include inorganic powders such as zinc borate, talc, calcium carbonate, boric acid, and aluminum hydroxide.

The content of these additives is preferably 20 parts by weight or less, and particularly preferably 5 parts by weight or less, for 100 parts by weight of the base resin consisting of the polypropylene resin forming the core layer. Particularly, the amount of the cell control agent is preferably 0.005 to 1 part by weight to adjust the average cell diameter of the expanded beads to 20 to 300 µm.

Next, the polypropylene resin of the coating layer constituting the multilayer resin beads used in the method for producing expanded beads according to the present invention may be the same as the polypropylene resin forming the core layer, except that the polypropylene resin is selected such that the relationship between the polypropylene resin of the coating layer and the polypropylene resin of the core layer satisfies the condition that multilayer expanded beads which can be molded at a steam pressure lower than the molding steam pressure of equivalent single layer expanded beads formed by foaming and expanding the single layer resin beads formed of the polypropylene resin forming the core layer that will be described below.

In the polypropylene resin of the coating layer, various additives can be incorporated if necessary, similarly to the case of the polypropylene resin of the core layer. Examples of these additives include an oxidation inhibitor, an ultraviolet inhibitor, an antistatic agent, a flame retardant, a metal inactivator, a pigment, a dye, and a crystal nucleating agent.

Among them, additives that impart functionality, such as an antistatic agent, a flame retardant, a metal inactivator, a pigment and a dye are preferred from the viewpoint that the effects are obtained by adding the additives only to the coating layer.

The content of these additives is preferably approximately 30 parts by weight or less, more preferably 20 parts by weight or less, and particularly preferably 5 parts by weight or less, for 100 parts by weight of the base resin composed of the polypropylene resin of the coating layer or the like. The lower limit of this content is approximately 0.01 parts by weight.

The expanded polypropylene resin beads of the present invention are, as previously described above, multilayer expanded beads formed by multilayer resin beads each composed of a core layer formed of a polypropylene resin and a coating layer formed of a polypropylene resin that is different from the polypropylene resin forming the core layer. In the multilayer expanded beads, the ratio (S/C) of the weight (S) of the coating layer resin and the weight (C) of the core layer resin, which constitute a multilayer resin bead, is from 0.001 to 0.040, and the average value of the thickness of the coating layer of the expanded beads, which is calculated based on the expansion ratio of the expanded beads, the weight ratio of the coating layer of a multilayer resin bead, or the like, is from 0.1 µm to 3.0 µm.

According to the present invention, when two or more kinds of expanded bead groups having respectively different ratios (S/C) of the weight (S) of the coating layer resin and the weight (C) of the core layer resin of the multilayer resin beads are mixed, the ratio (S/C) of the weight (S) of the coating layer resin and the weight (C) of the core layer resin of the mixed expanded bead group is determined as the total sum of the values which are each obtained by multiplying the mixed weight ratio of each of the expanded bead groups constituting the mixed expanded bead group, by the ratio (S/C) of that expanded bead group.

The multilayer expanded beads of the present invention as described above are such that the expanded beads can be sufficiently fuse-bonded with each other at a low steam pressure during the process of molding, even though the expanded beads use high melting point polypropylene resins in a major portion. Furthermore, since the coating layer portion constituting the multilayer expanded beads is formed from a thin film having a specific thickness, the properties inherent to the high melting point polypropylene resin of the core layer, such as rigidity, can be sufficiently manifested.

The multilayer expanded beads of the present invention are multilayer expanded beads that can be molded at a steam pressure lower than the molding steam pressure of the equivalent single layer expanded beads obtained by foaming and expanding single layer resin beads that are formed of the polypropylene resin forming the core layer of the multilayer resin beads intended for obtaining the multilayer expanded beads. That is, in comparison to the minimum steam pressure at which a satisfactory single layer expanded beads-molded article can be obtained when conventional single layer expanded beads having a base resin which is the same resin as that of the core layer of multilayer resin beads for obtaining the multilayer expanded beads of the present invention, and having an expansion ratio, an expanded bead diameter, an average cell diameter, and a high temperature peak calorific value of the expanded beads, which are equal or approximately equal to those of the multilayer expanded beads of the present invention (such single layer expanded beads are referred to as "single layer expanded beads equivalent to the multilayer expanded beads" in the present specification"), are subjected to in-mold molding, the multilayer expanded beads of the present invention are multilayer expanded beads having a lower minimum steam pressure at which a satisfactory expanded beads-molded article equivalent to the single layer expanded beads-molded article obtained when the multilayer expanded beads are in-mold molded in the same manner as in the case of the in-mold molding of the single layer expanded beads.

The multilayer expanded beads of the present invention are multilayer expanded beads in which a coating layer portion that can be molded at a low steam pressure and has excellent fusibility at the time of in-mold molding, is continuously or non-continuously formed around the core layer portion. Here, the phrase "the coating layer portion is continuously or non-continuously formed around the core layer portion" means that the coating layer portion may cover the entirety of the surface of the core layer, or may cover the surface of the core layer non-continuously, while leaving spaces, in a stripe pattern, a network pattern, a patchy pattern or the like. It is preferable that the coating layer portion cover 40% to 100%, more preferably 50% to 100%, and particularly preferably 60% to 100% of the surface of the core layer portion, from the viewpoint of fusibility at the time of in-mold molding.

A specific example of the multilayer expanded beads that can be molded at a low steam pressure may be multilayer expanded beads which satisfy the following expression (1) and expression (2), and/or expression (3).

Figure 5A:
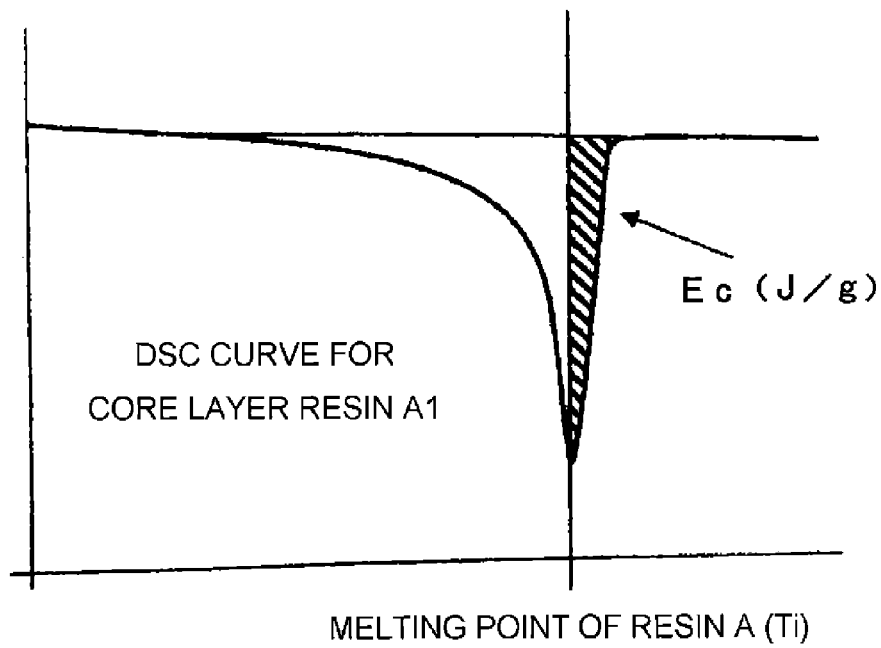
FIG. 5a is an explanatory diagram for the partial calorific value Ec. This represents the Ec of the core layer resin A1 used in the Example.
Figure 5B:
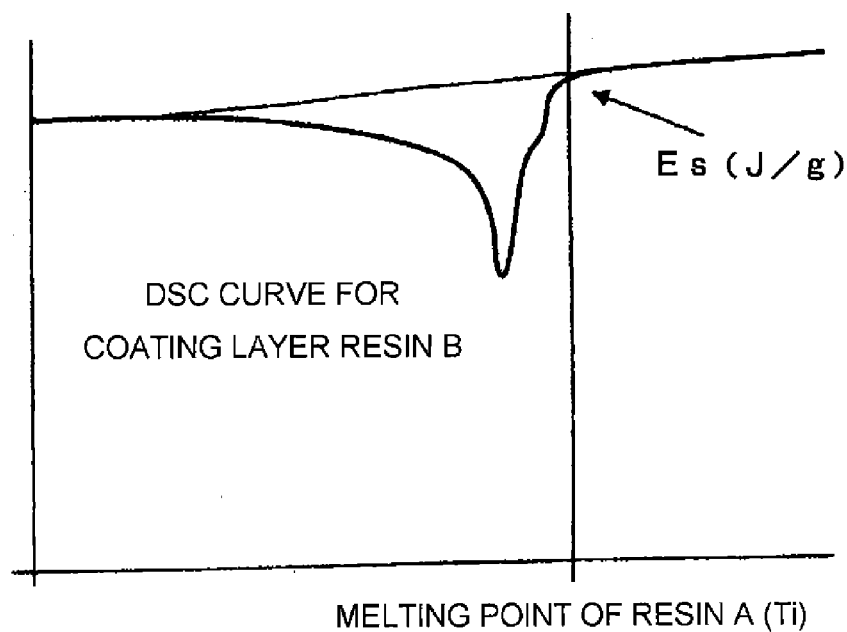
FIG. 5b is an explanatory diagram for the partial calorific value Es. This represents the Es of the coating layer resin B used in the Example.
Figure 5C:
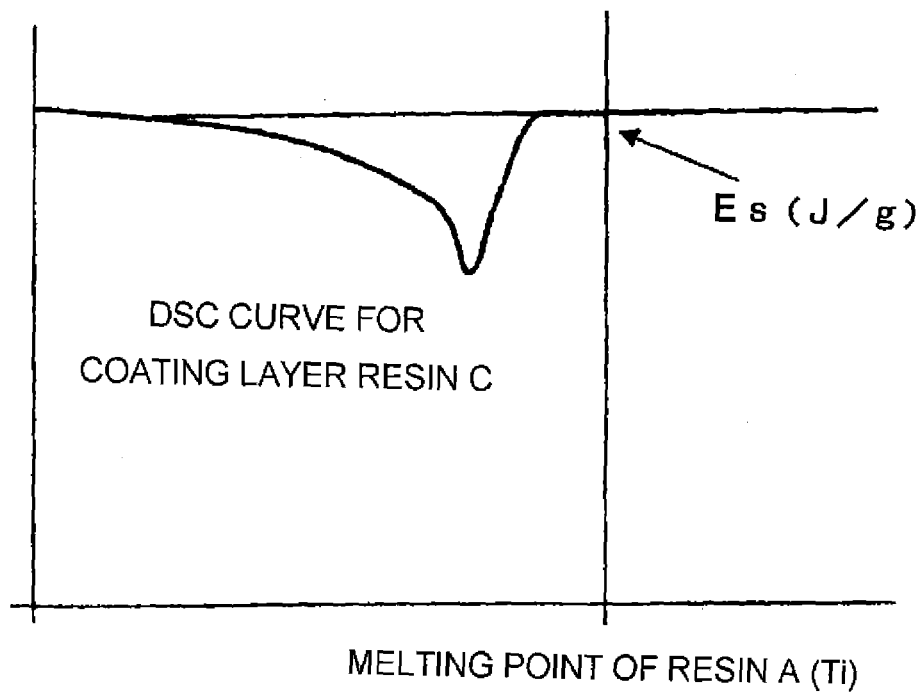
FIG. 5c is an explanatory diagram for the partial calorific value Es. This represents the Es of the coating layer resin C used in the Example.
Figure 5D:
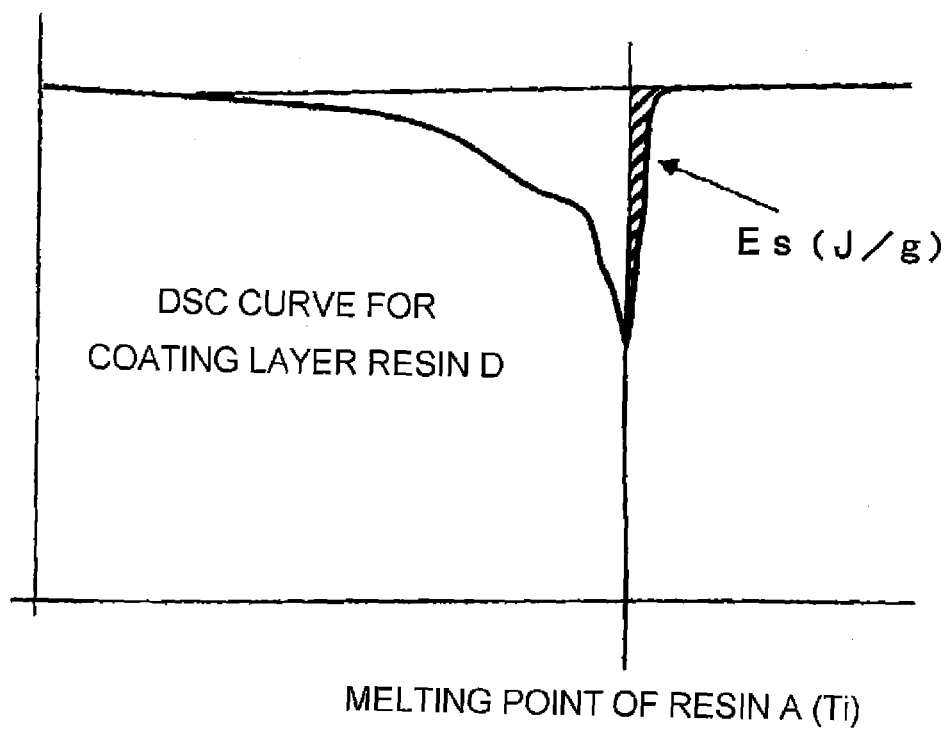
FIG. 5d is an explanatory diagram for the partial calorific value Es. This represents the Es of the coating layer resin D used in the Example.
Figure 5E:
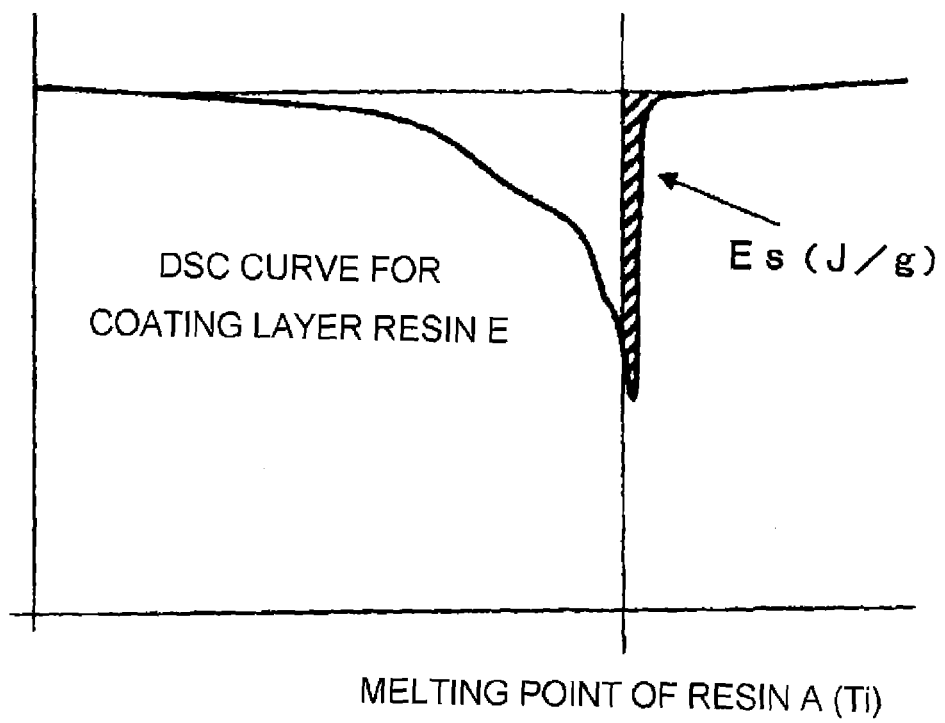
FIG. 5e is an explanatory diagram for the partial calorific value Es. This represents the Es of the coating layer resin E used in the Example.

That is, in a DSC endothermic curve characteristic to the raw material resins obtained by a heat flux differential scanning calorimetric analysis of the core layer resin and the coating layer resin, when the partial calorific value of the area under the temperature range of from the core layer melting point (Ti) of the core layer resin to higher temperatures as shown in FIG. 5a is designated as Ec (J/g), and the partial calorific value of the area under the temperature range of from the core layer melting point (Ti) of the coating layer resin to higher temperatures as shown in FIG. 5b to FIG. 5e is designated as Es (J/g), it is preferable that the relationship between the Ec of the polypropylene resin used as the raw material of the core layer and the Es of the polypropylene resin used as the raw material of the coating layer satisfy the following expression (1) and expression (2):

(Expression 1)

$$0 < Ec \leq 60 \quad (1)$$

(Expression 2)

$$0 \leq Es/Ec \leq 0.7 \quad (2)$$

In the partial calorific value (Ec) of the area under the temperature range of from the melting point of the polypropylene resin forming the core layer to higher temperatures, substantially 0 (zero) J/g does not exist as shown in FIG. 5a. As a characteristic of the polypropylene resin, since the upper limit of the melting end temperature is approximately 175° C. or lower, when the partial calorific value is 60 J/g or greater, the difference between the melting point and the melting end temperature increases. That is, a broad fusion peak shape is formed on the higher temperature side, and the secondary expandability of the resulting expanded beads is lowered.

For the coating layer resin, when the partial calorific value Es satisfies the relationship of the expression (2), even if expanded beads are obtained under an expansion condition which a high-temperature peak is likely to be formed during the expansion process of the resin beads that will be described below, the amount of crystals that induce a high temperature peak of the coating layer portion on the surfaces of the expanded beads is decreased. Therefore, it is speculated that the amount of the crystals that induce a high-temperature peak and the crystals melting at higher temperature that do not induce a high-temperature peak, present in the coating layer resin, are smaller than the amount of such crystals present in the core layer. As a result, the expanded beads exhibit more satisfactory fusibility with each other at the time of in-mold molding.

Therefore, according to the present invention, the multilayer expanded beads obtained by foaming and expanding multilayer resin beads that satisfy the requirements of the expressions (1) and (2) are such that when the expanded beads are heat molded at a low steam pressure, the expanded beads acquire excellent fusibility with each other, even if the melting point of the polypropylene resin of the coating layer is not necessarily lower than the melting point of the polypropylene resin of the core layer. In order to expand multilayer resin beads, it is preferable that at least the core layer portion have a high-temperature peak. Furthermore, it is also acceptable for the coating layer to have a high-temperature peak. However, it is speculated that when the expression (2) is satisfied, although it is difficult to verify by actually making measurements, there may be obtained a coating layer portion having a small high-temperature peak, as compared with the high temperature peak of the core layer portion, or a coating layer portion having no high-temperature peak, which has a difference showing the effect of improving the fusion-bonding between the expanded beads.

For the melting point (Ti) of the polypropylene rein of the core layer, the value obtained by a heat flux differential scanning calorimetric analysis method (DSC method) based on JIS K 7122 (1987) is employed.

That is, when the multilayer resin beads are produced, 2 to 4 mg of the polypropylene resin used as the raw material for the core layer is collected; the temperature is increased by a heat flux differential scanning calorimeter from room temperature (10° C. to 40° C.) to 220° C. at a rate of 10° C./min; after the temperature reaches 220° C., the temperature is decreased from 220° C. to 40° C. at a rate of 10° C./min, and then the temperature is increased for the second time from 40° C. to 220° C. at a rate of 10° C./min. The temperature at top of the DSC endothermic curve peak at the time of the second temperature increase as obtained by such a measurement is designated as the melting point. When two or more endothermic curve peaks are present, the maximum temperature of the endothermic curve peak having the largest calorific value is employed as the melting point.

Furthermore, as the DSC endothermic curve for calculating the partial calorific value of the polypropylene resin of the core layer, and the DSC endothermic curve for calculating the partial calorific value of the polypropylene resin of the coating layer, the DSC endothermic curve obtained at the time of the second temperature increase which is obtained in the same manner as in the method for measuring the melting point of the polypropylene resin of the core layer, is used.

Furthermore, it is preferable that the relationship between the melting point (Ts) of the polypropylene resin of the coating layer and the melting point (Ti) of the polypropylene resin of the core layer satisfy the following expression (3). The melting point (Ts) of the polypropylene resin of the coating layer can be determined in the same manner as in the case of the melting point (Ti) of the polypropylene resin of the core layer; except that the measurement is carried out using the raw material for the coating layer.

(Expression 3)

$$0 (° C.) < Ti - Ts \quad (3)$$

It is well known that multilayer expanded beads satisfying the above expression (3) are multilayer expanded beads that can be molded at a low steam pressure.

For the expanded beads of the present invention, the weight ratio of the coating layer resin and the core layer resin (weight (S) of the coating layer resin/weight (C) of the core layer resin) in the multilayer resin beads is from 0.001 to 0.040, and the average value of the thickness of the coating layer portion of the expanded beads is from 0.1 μm to 3.0 μm.

It is preferable to form the multilayer resin beads so as to satisfy the specific weight ratio (S/C), from the viewpoint of obtaining expanded beads that can be molded at a low steam pressure. When the weight ratio of the multilayer resin beads is in the range described above, excellent fusibility of the expanded beads with each other is achieved at the time of in-mold molding of the expanded beads obtained by selecting the coating layer resin described above.

According to the present invention, the average value of the thickness of the coating layer portion of the expanded beads is from 0.1 μm to 3.0 μm. If the average value of the thickness of the coating layer portion of the expanded beads is less than 0.1 μm, there is a risk that the fusibility of the expanded beads with each other at the time of in-mold molding of the expanded beads may be insufficient.

On the other hand, if the average value of the thickness of the coating layer portion of the expanded beads is greater than 3.0 μm, there will be no problem with the mutual fusibility of the expanded beads as long as the coating layer portion is not in an expanded state. However, there is a risk that with regard to the compression characteristics of the expanded beads-molded article obtained by in-mold molding of the expanded beads, it may be difficult to allow the characteristics such as rigidity inherent to the polypropylene resin of the core layer to be sufficiently exhibited. If the average value of the thickness of the coating layer portion is excessively large, the compression characteristics of the expanded beads-molded article should be secured by increasing the calorific value of the high temperature peak of the core layer portion of the expanded beads to about the upper limit. Thus, in order to resolve insufficient expansion resulting therefrom, pressure molding by which in-mold molding is carried out by applying a high internal pressure to the interior of the expanded bead, must be carried out.

From the viewpoint described above, the lower limit of the average value of the thickness of the coating layer portion of the expanded beads is preferably 0.1 μm or greater, more preferably 0.2 μm or greater, and particularly preferably 0.3 μm or greater. On the other hand, the upper limit of the average value of the thickness of the coating layer portion is 3.0 μm or less, more preferably 2.0 μm or less, and particularly preferably 1.5 μm or less.

According to the present invention, the coating layer of the multilayer resin beads turns into the coating layer portion of the expanded beads through an expansion process, but does not enter an expanded state. It is speculated that the coating layer portion does not enter an expanded state because when the multilayer resin beads are foamed and expanded, cells that can maintain an expanded state cannot be formed due to the relationship between the expanding force of the coating layer resin caused by the blowing agent contained in the coating layer, and the viscoelasticity of the resin forming the coating layer, and also because the resin weight ratio of the coating layer of the multilayer resin beads is small, and the thickness of the coating layer is considered to be less than the thickness required for expansion, that is, less than the thickness of the cell wall. On the other hand, when the resin weight ratio of the coating layer of the multilayer resin beads is large, and the thickness of the coating layer is sufficiently thick, the coating layer portion of the expanded beads frequently enters an expanded state, and there is a risk that the mutual fusibility of the expanded beads of the expanded beads-molded article may be insufficient.

According to the present invention, in regard to the average value of the thickness of the coating layer portion of the expanded beads, since the base resins for the core layer portion and the coating layer portion are all polypropylene resins, the boundary portions between the core layer portion and the coating layer portion are unclear, and the thickness of the coating layer portion is small, while actual measurement thereof is difficult. Therefore, a value calculated based on the bead weight of the expanded beads, the apparent density, L (length)/D (diameter), the weight ratio of the core layer resin in the multilayer resin beads that serve as the base of the expanded beads, the density of the coating layer resin, and the like, is employed. Furthermore, when the average value of the thickness of the coating layer portion of the expanded beads is calculated, in order to simplify the calculation, calculation is made under an assumption that the multilayer resin beads become expanded beads having a similar shape as a result of expansion. More accurately, the expanded beads obtained by foaming and expanding the multilayer resin beads do not have a similar shape as that of the multilayer resin beads. However, since it can be said that the average value of the thickness of the coating layer portion according to the present invention calculated under such a presumption is a value representing a positive correlation with the exact thickness of the coating layer portion of the expanded beads. Therefore, the characteristics of the expanded beads of the present invention can be represented by the constitution requirements of the calculated average value of the thickness of the coating layer portion.

As a specific example, in the case of obtaining expanded beads from cylindrical multilayer resin beads, the calculation of the average value of the thickness (Tt) of the coating layer portion can be carried out using the following expressions (4), (5) and (6).

(Expression 4)

$$Pd = \{(4 \times W)/(\pi \times Ld \times Db)\}^{(1/3)} \quad (4)$$

wherein the diameter of the cylindrical multilayer expanded beads is designated as Pd (cm), the weight of the multilayer resin beads as W (g), the apparent density of the multilayer expanded beads as Db (g/cm$^3$), and the ratio L/D of the expanded beads in the case where the multilayer expanded beads are expanded to a similar shape, as Ld.

(Expression 5)

$$Cd = \{Pd^2 - (4 \times R \times W)/(\pi \times Pd \times Ld \times \rho)\}^{(1/2)} \quad (5)$$

wherein the diameter of only the core layer portion of the cylindrical multilayer expanded beads is designated as Cd (cm), the weight ratio of the coating layer resin of the multilayer resin beads (weight (S) of the coating layer resin/(weight (S) of the coating layer resin+weight (C) of the core layer resin) as R (dimensionless), and the density of the coating layer resin as $\rho$ (g/cm$^3$).

(Expression 6)

$$Tt(\mu m) = \{(Pd - Cd)/2\} \times 10000 \quad (6)$$

As another specific example, in the case of obtaining expanded beads from spherical multilayer resin beads, the calculation of the average value of the thickness (Tt) of the coating layer portion of the expanded beads can be carried out using expression (8), which is the result of transposition of the following expression (7).

(Expression 7)

$$S/\rho = \pi/6\{X \times d^3 - X(d - 2 \times Tt \times 10000)^3\} \quad (7)$$

(Expression 8)

$$Tt(\mu m) = [-\{(6 \times S)/(\rho \times \pi \times X) + d^3\}^{(1/3)} - d]/(-20000) \quad (8)$$

wherein the diameter of the spherical multilayer resin beads is designated as d (cm), the weight of the coating layer of the multilayer resin beads as S (g), the expansion ratio of the multilayer expanded beads (resin density (g/cm$^3$) of the multilayer expanded beads/apparent density Db (g/cm$^3$) of the multilayer expanded beads) as X (dimensionless), and the density of the coating layer resin as $\rho$ (g/cm$^3$).

According to the present invention, the average value of the thickness (Tt) of the coating layer portion of the multilayer expanded beads can be adjusted to an intended value by regulating the weight of the coating layer resin of the multilayer resin beads, the weight of the core layer resin of the multilayer resin beads, the apparent density of the multilayer expanded beads, the ratio L/D of the multilayer resin beads, the diameter of the spherical multilayer resin beads, and the like.

According to the present invention, the average value of the thickness of the coating layer portion of a mixed expanded bead group obtained by mixing two or more kinds of expanded bead groups having different average values for the thickness of the coating layer portion, is determined as the sum of values each obtained by multiplying the mixing weight ratio of each expanded bead group constituting the mixed expanded bead group, by the average value of the thickness of the coating layer portion of that expanded bead group.

The reason why the compression characteristics of the expanded beads-molded article obtained from the expanded beads is insufficient when the average value of the thickness of the coating layer portion of the multilayer expanded beads is excessively larger than the average value of the thickness of the coating layer portion of multilayer expanded beads as specified in the present invention, is not clearly known. However, the reason is speculated to be as follows.

The resin constituting the coating layer portion of the multilayer expanded bead is a resin which improves fusibility of the expanded beads at the time of in-mold molding. However, the resin is inferior in terms of mechanical properties, among polypropylene resins. Furthermore, when the multilayer resin beads covered with the coating layer are expanded, the coating layer is rapidly cooled from an amorphous state at high temperature immediately before expansion, and therefore, the coating layer turns into a soft coating layer portion with an extremely small amount of crystals. The coating layer portion is therefore inferior in terms of properties, as described above, and the coating layer portion of the expanded beads has further deteriorated mechanical properties. Accordingly, it is speculated that the expanded beads-molded article obtained by in-mold molding expanded beads having a large thickness of the coating layer portion with significantly deteriorated mechanical properties, will have deteriorated compression characteristics.

The multilayer expanded beads according to the present invention are such that the secondary expandability of the expanded beads at the time of in-mold molding is poor due to the relationship with the heating temperature at the time of in-mold molding, as compared to conventional expanded beads that are single layer expanded beads which do not have a multilayer structure. The resulting expanded beads-molded article tends to have poor mold transferability by which the molded article acquires the same shape as the mold. From the viewpoint of improving the problem, the average cell diameter is preferably adjusted to 20 µm or larger, more preferably 25 µm or larger, and even more preferably 30 µm or larger. On the other hand, the upper limit is preferably 300 µm or less, from the viewpoint that the resulting expanded beads-molded article does not undergo destruction of the cells by the compression to which the molded article is usually subjected, the compression set is almost absent, and the molded article can be repeatedly used. The upper limit is more preferably 250 µm or less, and even more preferably 200 µm.

In regard to the method of measuring the average cell diameter, an expanded bead is bisected, the cross-section is magnified as large as possible so that the entire cross-section is displayed in a microscopic photograph, and an image of the cross-section is taken. Based on the photograph, a straight line is drawn on the photograph so that the cross-section is approximately bisected, and the value obtained by dividing the length of the straight line by the total number of cells intersecting the straight line, is designated as the average cell diameter of one expanded bead. The same value is determined for twenty expanded beads, and the arithmetic average of the values is employed as the average cell diameter.

In order to enhance the secondary expandability of the expanded beads at the time of in-mold molding, it is preferable that the polypropylene resin forming the core layer contain a small amount of a low melting point component. The low melting point component can be incorporated by introducing a low molecular weight component by adjusting the molecular weight of polypropylene at the time of polymerization, or incorporating, into the principal polypropylene resin forming the core layer, one or more polypropylene resins having a melting point lower than that of the principal polypropylene resin.

When a low melting point polypropylene resin is incorporated, the melting point of the low melting point polypropylene resin is preferably lower by 5° C. to 30° C., and more preferably lower by 8° C. to 25° C., than the melting point of the principal polypropylene resin. The amount of incorporation of the low melting point polypropylene resin is preferably 50 parts by weight or less, and more preferably 30 parts by weight, for 100 parts by weight of the principal polypropylene resin. On the other hand, the lower limit of the amount of incorporation is approximately 3 parts by weight. The amount of incorporation of the low melting point polypropylene resin is appropriately decided based on the relationship between the difference between the melting point of the principal polypropylene resin and the melting point of the low melting point polypropylene resin, and desired secondary expandability. However, when the difference between the melting points as described above, and the amount of incorporation as described above are employed, the secondary expandability of the expanded beads can be enhanced while maintaining or without significantly impairing the rigidity of the resulting expanded beads-molded article.

In the case of incorporating a low melting point polypropylene resin having a relatively large difference in the melting point within the range described above, it is preferable to incorporate a polypropylene resin having a higher elastic modulus even if the melting point is the same, and examples of such a polypropylene resin include polypropylene resins polymerized using a metallocene polymerization catalyst, and propylene-ethylene-butene terpolymers.

The expanded polypropylene resin beads-molded article formed by in-mold molding the multilayer expanded beads of the present invention that are obtained by foaming and expanding multilayer resin beads, each composed of a core layer formed of a polypropylene resin and a coating layer formed of a polypropylene resin different from the resin forming the core layer as described above, is an expanded polypropylene resin beads-molded article such that, in a stress-strain curve diagram obtained by performing a compression test of cutting a specimen (the surfaces of all sides being cut out) having a length of 50 mm, a width of 50 mm and a thickness of 25 mm from the expanded polypropylene resin beads-molded article thus obtained, and compressing the specimen in the thickness direction under the conditions of a temperature of 23° C. and a test rate of 10 mm/min until the strain reaches 55%, the stress (B) at a strain of 50% satisfies expression (9) with respect to the density (A) of the specimen; and such that among the inflection points for the amount of displacement obtained as a result of analyzing 100 sites of the surfaces (the coating layer portion of the expanded beads constituting the molded article) of the expanded polypropylene resin beads-molded article by a micro thermomechanical analysis (μTA), the average temperature (Tca) of 50 sites counted from the site having the smallest value of the temperature (Tc) of the inflection point on the lowest temperature side, is calculated, and the relationship between the Tca and the temperature (Td) of the inflection point on the lowest temperature side among the inflection points of the core layer portion of the analyzed expanded bead constituting the molded article, satisfies expression (10).

(Expression 9)

$$B > 0.0818A^2 + 5.98A + 55.8 \quad (9)$$

wherein B is expressed in the unit kPa, and A is expressed in the unit g/L.

The right-hand side of the expression (9) is an empirical formula for the second-order curve representing the relationship between the stress at a strain of 50% and the density of a conventional single layer-structured expanded polypropylene resin beads-molded article, which is not the molded article of the multilayer expanded beads of the present invention.

(Expression 10)

$$Tca(°C.) < Td(°C.) \quad (10)$$

The expanded beads-molded article obtained by heat molding the multilayer expanded beads in a mold according to the present invention is such that the average temperature (Tca) of the inflection points on the lower temperature side obtained by analyzing the surfaces of the molded article by a micro thermomechanical analysis, satisfies the expression (10) with respect to the relationship with the temperature (Td) of the inflection point on the lowest temperature side among the inflection points of the core layer portion of the expanded beads constituting the molded article.

On the other hand, when the average value of the coating layer thickness of the expanded beads is larger than the value calculated by the method described above, the mechanical strength of the expanded beads-molded article is decreased, and the expression (9) cannot be satisfied. Furthermore, when the average value of the thickness of the coating layer portion of the expanded beads is smaller than the value described above, the resulting expanded beads-molded article cannot satisfy the expression (10), and the steam pressure required for heat molding is increased.

The measurement of the inflection point by the micro thermomechanical analysis is carried out by increasing the temperature at a constant rate of 10° C./second. The temperature of the inflection point is defined as the intersection point between the tangent line to the base line, and the tangent line to a steep descending position of the amount of displacement originating from the melting of crystals, in a curve plotted for the amount of displacement and temperature.

The micro thermomechanical analysis is carried out using a micro thermal analysis system, "2990 Micro Thermal Analyzer" manufactured by T.A. Instruments Japan, Inc., under the conditions of a rate of temperature increase of 10° C./sec from 25° C. to 250° C.

Figure 3:
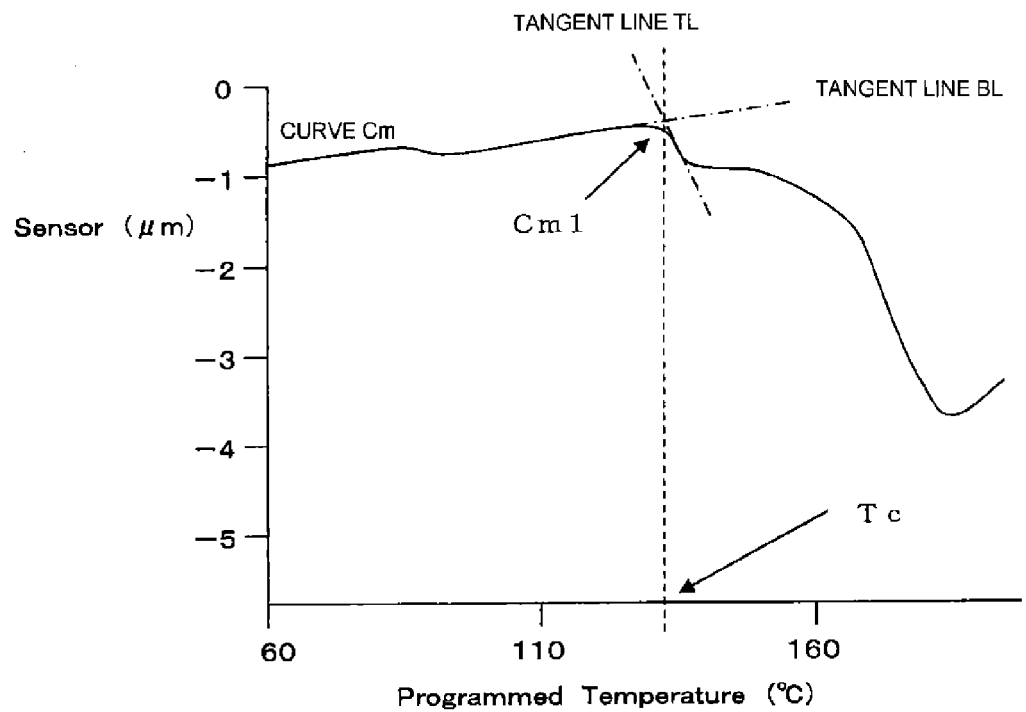
FIG. 3 shows an exemplary chart of a curve obtained by a micro thermomechanical analysis of the coating layer portion of the expanded beads.
Figure 4:
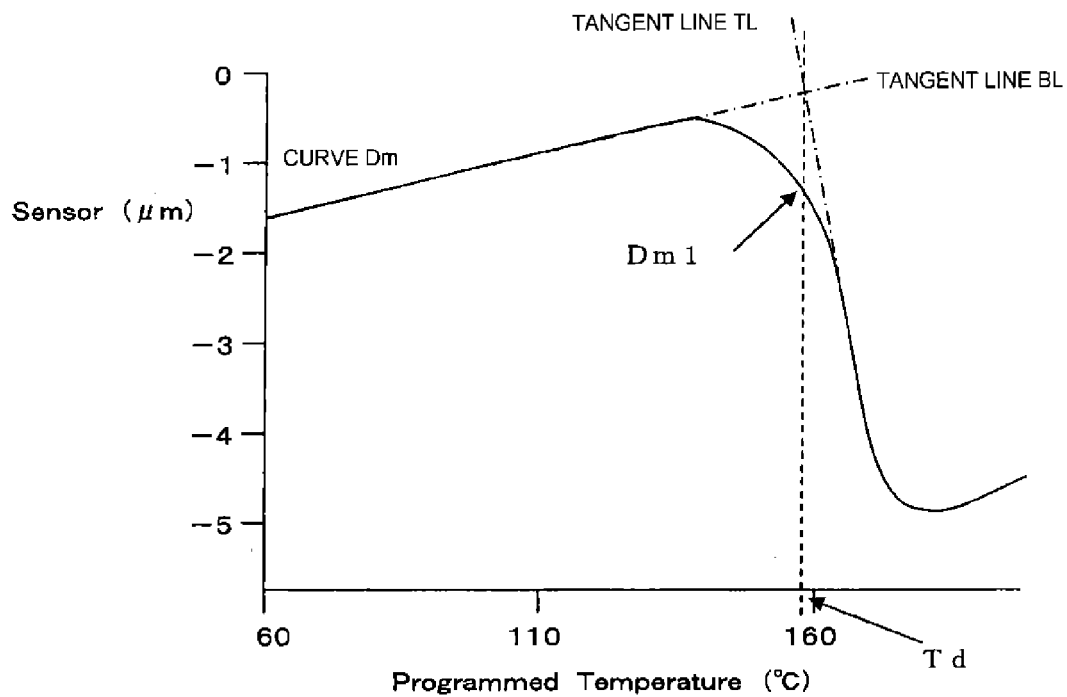
FIG. 4 shows an exemplary chart of a curve obtained by a micro thermomechanical analysis of the core layer portion of the expanded beads.

FIG. 3 and FIG. 4 show an example of the μTA curve of the coating layer portion and the core layer portion of an expanded bead or of an expanded bead constituting an expanded beads-molded article. The method of determining the steep inflection point originating from the melting of crystals for the coating layer portion of the expanded bead will be described with reference of these drawings.

FIG. 3 is a diagram showing an example of the μTA curve for the coating layer portion of a multilayer expanded bead, and FIG. 4 is a diagram showing an example of the μTA curve for the core layer portion of a multilayer expanded bead. In FIG. 3, the curve Cm is an example of the μTA curve for the coating layer portion of a multilayer expanded bead, and two tangent lines are produced against the curve Cm around the steep descent temperature of the amount of displacement in the curve Cm, and are respectively designated as tangent line BL and tangent line TL. The inflection point Tc is the intersection point between these tangent line BL and tangent line TL.

On the other hand, in FIG. 4, the curve Dm is an example of the μTA curve for the core layer portion of a multilayer expanded bead, and similarly, the intersection between the tangent line BL and the tangent line TL in the curve Dm is the inflection point temperature Td.

Here, the inflection point obtained by the micro thermomechanical analysis is measured by increasing the measurement temperature of the apparatus at a constant rate of 10° C./sec. The temperature of the inflection point is determined, in a curve of the displacement of the fusion of crystals and the temperature, from the intersection point between the tangent line to the base line and the tangent line at a steep descent position of the displacement originating from the fusion of crystals.

The micro thermomechanical analysis for the coating layer portion of an expanded bead is carried out by fixing an expanded bead (if a single expanded bead is too large as received, for example, a sample cut to an appropriate size by cutting the expanded bead into halves or the like) or a specimen cut out from an expanded beads-molded article, to a sample stage of the apparatus, and subsequently lowering a probe tip (the part that is brought into contact with the coating layer portion of the expanded bead has a tip which measures 0.2 μm both in the length and width) toward a randomly selected site on the surface of the expanded bead or an expanded bead constituting the expanded beads-molded article, and measurement is made while the probe tip is still in the state of being in contact with the coating layer portion of the expanded bead.

Furthermore, the micro thermomechanical analysis for the core layer of the expanded bead is carried out in the same manner as in the micro thermomechanical analysis for the coating layer portion of the expanded bead, except that the probe tip is lowered to the central area of the cross-section generated by approximately bisecting the expanded bead.

It is speculated that the inflection point temperature on the lowest temperature side of the coating layer portion of the multilayer expanded beads is lower as compared with that of the core layer portion, because when multilayer resin beads are expanded, the expansion is carried out on the basis of the melting point of the resin constituting the core layer, and therefore, the coating layer of the multilayer resin beads is rapidly cooled from a temperature higher than the melting point of the resin constituting the coating layer. Therefore, the smectic structure of low melting point crystals is increased, and thus the melting initiation temperature of the coating layer portion of the multilayer expanded beads is decreased.

In regard to the in-mold molding of expanded beads, since fusion-bonding between the expanded beads with each other occurs at the surfaces of the expanded beads, it is significantly meaningful to perform a thermal analysis as described above, only for the surfaces of the expanded beads. When the central area and the surface areas of the expanded beads are subjected to the micro thermomechanical analysis, it is determined whether the object of analysis is a multilayer expanded bead, or whether the object of analysis is a multilayer expanded beads-molded article. On the other hand, it is thought to be impossible to understand the tendency of the initiation of melting only for the surfaces of expanded beads, through a DSC method. However, the μTA enables the understanding of the tendency. Furthermore, in the μTA, the rate of temperature increase is set to 10° C. per second, and this rate is believed to be close to the rate of temperature increase employed at the time of heating the expanded beads during the actual in-mold molding process (such a fast rate of temperature increase is difficult for the DSC method).

In regard to the expanded beads of the present invention, when the shape of the expanded beads is constructed to be cylindrical, the expanded beads can be fuse-bonded with each other without destroying the cylindrical shape at the time of molding an expanded beads-molded article. Therefore, an expanded polypropylene resin beads-molded article having a high porosity is obtained.

Examples of the shape of the multilayer resin beads used in the present invention include a pillar shape, a rugby ball shape, a spherical shape, and a cylindrical shape. The expanded beads obtained by foaming and expanding such multilayer resin beads acquire a pillar shape, a spherical shape, a rugby ball shape or a cylindrical shape, in accordance with the shape of the resin beads prior to expansion. Among these shapes, when a cylindrical shape is selected, an expanded beads-molded article having a high porosity can be obtained, and an expanded beads-molded article resulting therefrom is excellent in water infiltration properties and sound absorption properties.

When it is said that the shape of the expanded polypropylene resin beads described above in the present invention is a cylindrical shape, the expanded beads include pillar-shaped expanded beads having a columnar shape, an elliptic cylindrical shape, a prism shape or the like, and having one or two or more through-holes that penetrate through the pillar in the vertical direction (for example, FIG. 2(A) to FIG. 2(F) described in JP-A No. 7-137063), as well as hollow-shaped expanded beads having blade-like protrusions on parts of the outer surface in addition to the shape having through-holes (for example, FIG. 3(Q) to FIG. 3(U) described in JP-A No. 7-137063), and expanded beads having a cutout portion in some parts in addition to the shape having through-holes (for example, FIG. 2(H) described in JP-A No. 7-137063).

Next, an example of the method for producing multilayer resin beads according to the present invention will be described.

First, the polypropylene resin for constituting the core layer, another resin that is optionally incorporated, and additives optionally incorporated, are supplied to one extruder, and the mixture is heated and kneaded. Thus, a first molten resin for core layer formation is formed. At the same time, the polypropylene resin for constituting the coating layer, another resin that is optionally incorporated, and additives optionally incorporated, are supplied to another extruder, and the mixture is heated and kneaded. Thus, a second molten resin for coating layer formation is formed.

Subsequently, the first molten resin and the second molten resin are supplied to a co-extrusion die, and at inside the die, the stream of the first molten resin and the stream of the second molten resin are combined such that the stream of the second molten resin wraps the surrounding of the strand-like stream of the first molten resin, to thereby laminate the two resin streams. Thus, the laminated and combined molten resins are extruded from the die in a strand form, cooled, and cut to a size to obtain the desired weight of resin beads. Thereby, multilayer resin beads can be produced.

Further, adjustment of the thickness of the coating layer in the multilayer resin beads can be carried out by regulating the balance between the discharge amount of the core layer and the discharge amount of the coating layer, or by regulating the rate of pulling the strand-like extrusion product.

Furthermore, since the discharge amount of the coating layer is very small compared with the discharge amount of the core layer, it is necessary to devise the discharge so that the resins can be evenly distributed to all of the strand extrusion holes provided on the die, and the second molten resin can be laminated on the first molten resin as uniformly as possible. For this purpose, the structure inside the die is also important; however, since the resin distribution becomes more uniform when the MFR of the second molten resin constituting the coating layer is larger than the MFR of the first molten resin constituting the core layer, it is preferable that the MFR value of the second molten resin be equal to or greater than the MFR value of the first molten resin.

As such, it is suitable to cut the resin beads after co-extruding the resin into a strand form, in order to obtain multilayer resin beads in which a coating layer is laminated on a core layer. However, according to the present invention, a method of obtaining multilayer resin beads by a co-extrusion underwater cutting method may be employed, or a method of obtaining multilayer resin beads by cutting a co-extruded multilayer sheet may be employed.

The area occupied by the coating layer relative to the surface area of a multilayer resin bead preferably occupies 40% or more, more preferably 50% or more, and particularly preferably 60% or more, of the surface area from the viewpoint that the expanded beads obtained by foaming and expanding the multilayer resin beads acquire excellent fusibility, and form an expanded beads-molded article having excellent flexural strength and the like. Furthermore, the coating layer at the surface of the multilayer resin bead may be coated in a linear shape or in a network shape or the like. In this case, for the average value of the thickness of the coating layer portion of the expanded beads, the value calculated from the weight ratio of the coating layer and the core layer as described above will be employed.

Subsequently, a preferred example of the method of obtaining expanded beads using multilayer resin beads will be described.

The multilayer resin beads having the constitution of the present invention are dispersed together with a blowing agent and the like, in an aqueous medium such as water or an alcohol in a sealed vessel such as an autoclave, and the multilayer resin beads are heated, under stirring, to a temperature equal to or higher than the softening temperature of the polypropylene resin forming the core layer, to thereby impregnate the blowing agent into the multilayer resin beads. Subsequently, while the pressure inside the sealed vessel is maintained at a pressure equal to or higher than the vapor pressure of the blowing agent, one end under the water surface inside the sealed vessel is opened, and the multilayer resin beads and the aqueous medium are simultaneously discharged from the vessel in an atmosphere at a low pressure, and the multilayer resin beads are foamed and expanded (hereinafter, referred to as "dispersion medium discharging expansion method"). Usually, the aqueous medium described above is preferably water, from the viewpoint of handling.

In the dispersion medium discharging expansion method, when the multilayer resin beads are heated in the vessel, it is preferable to add a dispersant into the dispersion medium so that the multilayer resin beads do not fuse with each other in the vessel. Such a dispersant may be any dispersant which prevents the fusion of the multilayer resin beads in the vessel, and organic dispersants and inorganic dispersants can all be used. However, from the viewpoint of easy handleability, inorganic substances in a fine particle form are preferred. Examples include natural or synthetic clay minerals such as amusnite, kaolin, mica, and clay; aluminum oxide, titanium oxide, basic magnesium carbonate, basic zinc carbonate, calcium carbonate, calcium phosphate, and iron oxide, and these may be used singly or as combinations of several kinds. Further the dispersant is usually used in an amount of about 0.001 to 5 parts by weight per 100 parts by weight of the multilayer resin beads.

Furthermore, in the dispersion medium discharging expansion method, a dispersion enhancement agent which strengthens the dispersion force of the dispersant (having a function of preventing fusion between the multilayer resin beads in the vessel, even if the amount of addition of the dispersant is small) may be added to the dispersion medium. Such a dispersion enhancement agent is an inorganic compound which can be dissolved in an amount of at least 1 mg or more in 100 cc of water at 40° C., and at least one of the anion and the cation of which is divalent or trivalent. Examples of such an inorganic substance include magnesium chloride, magnesium nitrate, magnesium sulfate, aluminum chloride, aluminum nitrate, aluminum sulfate, iron chloride, iron sulfide, and iron nitrate. In the case of producing expanded beads having an apparent density of 100 g/L or greater, it is preferable to use a dispersion enhancement agent. The dispersion enhancement agent is usually added to the dispersion medium at a proportion of about 0.0001 to 1 part by weight per 100 parts by weight of the multilayer resin beads.

Examples of the blowing agent that is used for the dispersion medium discharging expansion method include organic physical blowing agents, such as aliphatic hydrocarbons such as propane, butane, hexane, and heptane; cyclic aliphatic hydrocarbons such as cyclobutane and cyclohexane; and halogenated hydrocarbons such as chlorofluoromethane, trifluoromethane, 1,2-difluoromethane, 1,1,1,2-tetrafluoroethane, methyl chloride, ethyl chloride, and methylene chloride; and so-called inorganic physical blowing agents such as nitrogen, oxygen, air, carbon dioxide, and water. Furthermore, an organic blowing agent and an inorganic blowing agent can be used in combination. It is preferable to use the physical blowing agents described above, from the viewpoint that expanded beads having a low apparent density can be easily obtained. Among the physical blowing agents, one or two or more inorganic physical blowing agents selected from the group consisting of nitrogen, oxygen, air, carbon dioxide and water are suitably used as main components. Furthermore, among these, when the stability of the apparent density of the expanded beads, environmental burden, cost and the like are considered, nitrogen or air is preferred. In the case of using water as the blowing agent, the water used as a dispersion medium for dispersing the multilayer resin beads in a sealed vessel may be directly used.

The filling amount of the physical blowing agent in the vessel in the dispersion medium discharging expansion method is appropriately selected in accordance with the type of the blowing agent used, the expansion temperature, and the desired apparent density of the expanded beads. Specifically, for example, when nitrogen is used as the blowing agent and water is used as the dispersion medium, it is preferable to select the filling amount such that the pressure inside the sealed vessel, that is, the pressure (gauge pressure) in the space inside the sealed vessel, which is in a stabilized state immediately before the initiation of expansion, is 0.6 to 6 MPa(G). In general, as the desired apparent density of the expanded beads is smaller, it is preferable to set the pressure of the space in the vessel to be higher, and as the desired apparent density of the expanded beads is larger, it is preferable to set the pressure of the space to be lower.

In the dispersion medium discharging expansion method, filling of the physical blowing agent in the vessel may be carried out by filling the physical blowing agent simultaneously with the initiation of temperature increase, by filling the agent in the middle of the temperature increase, or by filling the agent in a stabilized state immediately before the initiation of expansion.

The method of heating and softening multilayer resin beads impregnated with a blowing agent and foaming and expanding the multilayer resin beads according to the present invention, is not intended to be limited to the dispersion medium discharging expansion method described above. A method of foaming and expanding expandable multilayer resin beads that are impregnated with a blowing agent, by means of a heating medium such as heated steam or hot air, as described in JP-A No. 4-372630 for example, is also acceptable, and a method of obtaining expanded beads by a co-extrusion expansion method is also acceptable.

The expanded beads of the present invention are expanded beads formed by foaming and expanding multilayer resin beads which are preferably produced by the method described above and are each composed of a core layer formed of a polypropylene resin and a coating layer formed of a polypropylene resin, and the expanded beads are each composed of a core layer portion formed by foaming and expanding the core layer of the multilayer resin beads, and a coating layer portion formed by stretching the coating layer of the multilayer resin beads.

The coating layer portion of the expanded beads formed from the coating layer of the multilayer resin beads is substantially in an unexpanded state. Here, being in an unexpanded state implies that for 100 expanded beads arbitrarily selected, one photograph (magnification ratio 200 times) of the cross-section of the coating layer portion is taken for one expanded bead (total 100 photographs), and among them, the number of cross-section photographs in which the coating layer portion has expanded is 0 to 10, and preferably 0 to 5.

The expanded beads of the present invention preferably have an apparent density of 10 g/L to 500 g/L. If the apparent density is less than 10 g/L, there is a risk that the expanded beads are likely to have a high open cell content, and a satisfactory expanded beads-molded article may not be obtained. On the other hand, if the apparent density is greater than 500 g/L, there is a risk that the resulting expanded beads-molded article may have an excessively large density, and properties characteristic to a foam, such as thermal insulation properties, buffering properties and lightweight may be lost.

The apparent density (g/L) of the expanded beads is calculated by dividing the weight (g) of a group of the expanded beads by their apparent volume (L). The apparent volume (L) of a group of expanded beads is determined by submerging about 5 g of a group of expanded beads that have been left to stand for 48 hours or longer at 23° C. and at the atmospheric pressure, in water in a mass cylinder containing 100 cm$^3$ of water at 23° C., reading the excluded volume, and converting this to a value expressed in the liter unit.

The base resin of the expanded beads of the present invention may be crosslinked, but it is preferable that the base resin be substantially non-crosslinked. Being substantially non-crosslinked indicate that the proportion of a fraction that is insoluble in boiling xylene is 1% by weight or less.

The DSC curve obtained by a heat flux differential scanning calorimetric analysis of the expanded beads according to the present invention exhibits at least an endothermic curve peak intrinsic to a polypropylene resin (intrinsic peak) and an endothermic curve peak on the higher temperature side than the foregoing endothermic curve peak (high-temperature peak), and the calorific value of the endothermic curve peak on the higher temperature side is preferably from 5 J/g to 40 J/g, more preferably 10 J/g to 40 J/g, and particularly preferably 15 J/g to 35 J/g. Such expanded beads are expanded beads that have a high closed cell content and are suitable for heat molding.

If the calorific value of the high temperature peak is too small, the steam pressure at the time of molding the expanded beads may be lowered, but there is a risk that the compressive strength, the amount of energy absorption and the like of the resulting expanded beads-molded article may be decreased. On the other hand, if the calorific value of the high-temperature peak is too large, a pressure should be applied inside the expanded beads prior to the molding process for the expanded beads, and there is a risk that the molding cycle may be lengthened.

Furthermore, the calorific value of the high-temperature peak is preferably 15% or greater, more preferably 20% or greater, even more preferably 25% or greater, and particularly preferably 30% or greater, relative to the sum of the calorific values of all the endothermic curve peaks. Furthermore, the upper limit is preferably 70% or less, more preferably 60% or less, and particularly preferably 50% or less.

Also, the sum of the calorific values (total calorific value) of all the endothermic curve peaks of the expanded beads according to the present invention is preferably 60 to 150 J/g. If the calorific value is too small, there is a risk that the strength properties such as compressive strength may be deteriorated. On the other hand, if the calorific value is too large, there is a risk that an expanded beads-molded article having many voids may be obtained, since the expanded beads forming the expanded beads-molded article have poor secondary expandability at the time of molding.

In regard to the polypropylene resin forming the coating layer, it is preferable that the high-temperature peak of the polypropylene resin forming the coating layer portion do not exist, or that the high-temperature peak of the polypropylene resin forming the coating layer portion have a smaller calorific value than the high-temperature peak of the polypropylene resin forming the core layer portion, under the expansion conditions under which the polypropylene resin forming the core layer portion has a high-temperature peak to an appropriate extent. For the endothermic curve peaks which are intrinsic peaks of the polypropylene resin forming the coating layer and the polypropylene resin forming the core layer, since it is speculated that the part on the higher temperature side preferentially becomes the high-temperature peak, it is possible to manage the difference between the high-temperature peak of the coating layer portion and the high-temperature peak of the core layer portion on the basis of the ratio, when the multilayer expanded beads are produced.

That is, by comparing the calorific values of particular parts of the intrinsic peaks, the magnitude of the calorific value of a certain particular high-temperature peak can be predicted. In order to satisfy the requirements for molding by low pressure steam of the present invention, based on the melting point of the polypropylene resin forming the core layer, the ratio (Es/Ec) of the partial calorific value (Es) for the area under the temperature range of from the melting point of the polypropylene resin forming the core layer to higher temperatures in the polypropylene resin forming the coating layer, and the partial calorific value (Ec) for the area under the temperature range of from the melting point to higher temperatures in the polypropylene resin forming the core layer is preferably in the range of 0 to 0.70, more preferably 0 to 0.65, and particularly preferably 0 to 0.60.

The measurement of the total calorific value of the endothermic curve peaks and the calorific value of the high-temperature peak is carried out as follows according to the measurement method equivalent to JIS K7122 (year 1987).

First, 2 to 10 mg of expanded beads are collected, and measurement is performed by increasing the temperature from room temperature (10° C. to 40° C.) to 220° C. at a rate of 10° C./min using a heat flux differential scanning calorimeter. An example of the first time DSC curve obtained by such measurement is shown in FIG. 1.

In the DSC curve of FIG. 1, the intrinsic peak a and the intrinsic peak b appear, which are derived from the polypropylene resin constituting the expanded beads. The calorific value of the high-temperature peak b corresponds to the peak area, and specifically, the calorific value can be determined as follows.

First, a straight line (α-β) which connects the point α corresponding to 80° C. on the DSC curve with the point β corresponding to the melting end temperature T of the expanded beads on the DSC curve is drawn. Here, the melting end temperature T is the temperature corresponding to the intersection between the DSC curve on the higher temperature side of the high-temperature peak b and the base line on the higher temperature side. Subsequently, a straight line parallel to the ordinate of the graph is drawn from the point γ corresponding to the valley portion between the intrinsic peak a and the high-temperature peak b on the DSC curve, and the point where the parallel line intersects the straight line (σ-β) is designated as σ. The area of the high-temperature peak b is the area of the region surrounded by the curve of the portion of the high-temperature peak b on the DSC curve, (σ-β) and the line segment (γ-σ) (the shaded region in FIG. 1), and this area corresponds to the calorific value of the high-temperature peak. Furthermore, the sum of the calorific values of all the endothermic curve peaks according to the present specification is indicated by the area of the region surrounded by the DSC curve and the straight line (α-β) in FIG. 1, and this area corresponds to the total calorific value of the endothermic curve peaks.

Figure 2:
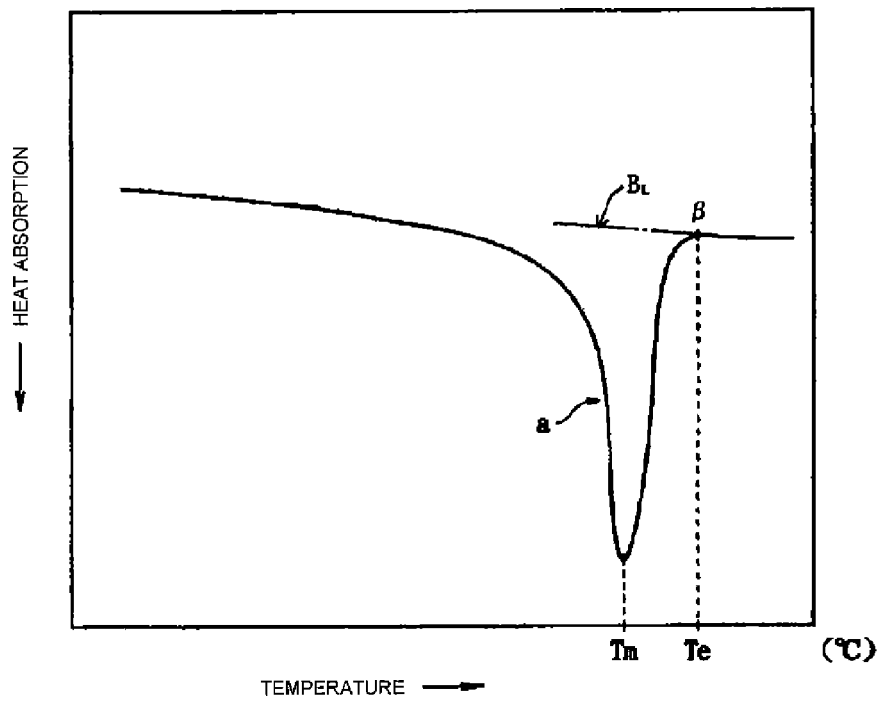
FIG. 2 shows an exemplary chart of a second time DSC endothermic curve of expanded polypropylene resin beads.

Furthermore, the high-temperature peak b is recognized in the first time DSC curve measured as described above, but is not recognized in the second time DSC curve. In the second time DSC curve, only the endothermic curve peak intrinsic to the polypropylene resin constituting the expanded beads (intrinsic peak a) is recognized as shown in FIG. 2. Here, the second time DSC curve is a DSC curve which is obtained, after obtaining the first time DSC curve, by decreasing the temperature to 40° C. at a rate of 10° C./min and increasing the temperature again up to 220° C. at a rate of 10° C./min in a heat flux differential scanning calorimetric analysis.

When the intrinsic peak and the high temperature peak of the expanded beads are measured using a heat flux differential scanning calorimetric analyzer as described above, if the weight of a peace of single expanded bead is less than 2 mg, it is preferable to use plural expanded beads in the measurement so that the total weight is 2 to 10 mg. Furthermore, if the weight of a peace of single expanded bead is 2 to 10 mg, one expanded bead may be directly used in the measurement. If the weight of a peace of single expanded bead is greater than 10 mg, it is preferable to cut one expanded bead into several pieces so that each piece weighs 2 to 10 mg, and to use one piece of the cut sample in the measurement. However, even though this cut sample is obtained by cutting one expanded bead using a cutter knife or the like, cutting the sample such that the ratio of the coating layer portion and the core layer portion in the expanded bead as a whole is largely changed, and using such a piece as a cut sample should be definitely avoided. As a preparation example of the cut sample, in the case where the weight of a peace of single expanded bead is 18 mg, when the expanded bead is laid in an arbitrary direction and cut horizontally at the center of the vertical direction, two cut samples weighing about 9 mg and having an almost the same shape are obtained. For each of the cut samples, the ratio of the coating layer portion and the core layer portion of the expanded bead initially possessed remains unchanged. One of the two cut samples thus obtained may be used in the measurement of the intrinsic peak and the high-temperature peak as described above.

Next, the technical meaning of the high-temperature peak for the expanded bead of the present invention, and the relationship between the calorific value of the high-temperature peak and the constitution of the present invention will be explained.

The high-temperature peak appears in the first time DSC curve as described above, and is attributable to the crystal structure of the polypropylene resin. It can be seen that the magnitude of the calorific value of this high-temperature peak is strongly affected by the difference between the melting point of the resin and the temperature at the time of expanding the resin beads.

Furthermore, it can be seen that generally, when the expanded beads are filled in a mold and heat molded with steam, there exists a minimum saturated steam pressure (referred to as minimum steam pressure) required for the expanded beads to satisfactorily fuse-bond with each other in the mold. Here, the temperature corresponding to the minimum steam pressure is called the minimum fusion-bonding temperature.

It is known that the calorific value of the high-temperature peak is closely related to the minimum fusion-bonding temperature, and serves as a factor determining the minimum fusion-bonding temperature. Furthermore, in the case of using an identical polypropylene resin, there is a tendency that when the calorific value of the high-temperature peak is small, the minimum fusion-bonding temperature is lowered. Furthermore, the value of the calorific value of this high-temperature peak is strongly affected by the level of the expansion temperature in the stage of the production of the expanded beads, so that when an identical polypropylene resin is used, there is a tendency that as the expansion temperature increases, the value of the calorific value of the high-temperature peak decreases.

When an expanded beads-molded article is molded using expanded beads having a small calorific value of the high-temperature peak, the minimum fusion-bonding temperature tends to be relatively lower. However, the strength properties such as compressive strength (rigidity) of the expanded beads-molded article tend to relatively deteriorated. On the other hand, when an expanded beads-molded article is heat molded using expanded beads having a large calorific value of the high-temperature peak, the mechanical properties such as compressive strength of the expanded beads-molded article tends to relatively increase. However, the minimum fusion-bonding temperature is relatively increased, and thus, a high steam pressure is required when an expanded beads-molded article is produced as described above.

That is, the most preferred expanded beads are expanded beads having opposite properties at the same time, such that the expanded beads-molded article has relatively high strength properties such as compressive strength, irrespective of whether the minimum fusion-bonding temperature is low. The expanded beads of the present invention are capable of simultaneously satisfying such contradictory properties, and despite being expanded beads formed from polypropylene resins having excellent mechanical strength properties and the like, have the minimum fusion-bonding temperature effectively lowered. Therefore, when heat molding of the expanded beads-molded article is carried out using the expanded beads of the present invention, a molded article having excellent strength in terms of mechanical properties such as compressive strength can be produced using a conventional molding apparatuses.

Next, the method of regulating the calorific value of the high-temperature peak of the expanded beads of the present invention in regard to the dispersion medium discharging expansion method described above, will be described. That is, the expanded beads can be obtained by, as described above, a method of dispersing multilayer resin beads in water together with an blowing agent in a sealed vessel, heating the mixture, impregnating the blowing agent into the multilayer resin beads, and then discharging the system to a low pressure atmosphere.

In the case of expanding the multilayer resin beads described above by the dispersion medium discharging expansion method, when the heating temperature and the heating time are set as will be described below based on the melting point of the polypropylene resin forming the core layer, a large calorific value of the high-temperature peak may be obtained, and the expanded beads thus obtained can acquire excellent strength properties such as compressive strength.

As a specific method for regulating the high temperature peak in the dispersion medium discharging expansion method, when the multilayer resin beads are dispersed in an aqueous medium and heated, regulation is preferably achieved such that the temperature is increased to be not higher than the melting end temperature (Tie) of the polypropylene resin of the core layer, heating is stopped at an arbitrary temperature (Ta) in the range of from a temperature lower by 20° C. or more than the melting point (Ti) of the resin to below the melting end temperature (Tie) of the resin, the multilayer resin beads are maintained at that temperature (Ta) for a sufficient time period, preferably for about 10 to 60 minutes, subsequently the multilayer resin beads are heated to an arbitrary temperature (Tb) in the range of from a temperature lower by 15° C. than the melting point (Ti) to melting end temperature (Tie)+10° C., heating is stopped at that temperature, the multilayer resin beads are further maintained at that temperature for a sufficient time period, preferably about 10 to 60 minutes, and then the multilayer resin beads are discharged from the sealed vessel to a low pressure atmosphere to thereby foam and expand.

In the dispersion medium discharging expansion method, it is preferable to set the temperatures Ta and Tb and the retention time as described above, because the magnitude of the high-temperature peak of the expanded beads is dependent mainly on the temperature Ta, the retention time at that temperature, the temperature Tb, and the retention time at that temperature for the resin beads upon the production of the expanded beads, and on the rate of temperature increase.

In general, as the temperature Ta or Tb is lower within the temperature range described above, or the retention time is longer, the calorific value of the high-temperature peak of the expanded beads tends to become larger. Usually, a rate of temperature increase of 0.5° C. to 5° C./min is employed in the expansion process. When a preliminary experiment is repeated while considering these factors, the production conditions for the expanded beads exhibiting a desired calorific value of the high-temperature peak can be found easily and accurately.

Further, the temperature adjustment range at the time of expansion of the resin beads as described above is an appropriate temperature range in the case of using an inorganic physical blowing agent as the blowing agent. When an organic physical blowing agent is used in combination, the appropriate temperature range tends to be shifted to a lower temperature side than the temperature range described above, in accordance with the type or amount of use of the organic physical blowing agent.

It is preferable to subjecting the expanded beads of the present invention to heat molding after aging the expanded beads at the atmospheric pressure, and after increasing the internal pressure if necessary, because an expanded beads-molded article having no gaps between the expanded beads can be obtained. It is also preferable since the strength properties such as compressive strength of the resulting expanded beads-molded article are also improved.

Further, when the cell internal pressure of the expanded beads is increased, it is preferable to place the expanded beads in a sealed vessel, leaving the expanded beads for an appropriate time while pressurized air is supplied to the vessel, so as to allow the pressurized air to penetrate into the expanded beads. The apparent density of the expanded beads-molded article produced from such expanded beads can be set to any value according to the purpose, but the apparent density is usually in the range of 9 g/L to 600 g/L. The apparent density of the expanded beads-molded article is calculated by dividing the weight (g) of a specimen cut out from the molded article by the volume (L) determined from the external dimension of the specimen.

The expanded beads having an increased cell internal pressure can be converted to expanded beads having a higher expansion ratio, through a step of heating using steam or hot air and a so-called two-stage expansion step. When in-mold molding is carried out using such expanded beads having a high expansion ratio, an expanded beads-molded article having a high expansion ratio can be easily obtained.

It is also preferable to produce the expanded beads-molded article by employing a batch type in-mold heat molding method, in which after the expanded beads have the internal pressure increased as necessary, the expanded beads are filled in a mold which is capable of heating and cooling and is sealable by opening and closing, the expanded beads are heated in the mold by supplying saturated steam so that the expanded beads expand and fuse-bond, and then the expanded beads are cooled and removed from the mold.

In regard to the molding machine used for the batch type in-mold heat molding method, there are already a wide variety of numerous molding machines, and the machines vary to some extent from country to country. However, many of the molding machines are operated at an internal pressure of 0.45 MPa (G) or less. Therefore, it is preferable that the pressure of saturated steam at the time of allowing the expanded beads to expand and fuse-bond with each other be 0.45 MPa (G) or less, and more preferably 0.43 MPa (G) or less. It is particularly preferable that the pressure of saturated steam be 0.40 MPa (G) or less, from the viewpoint of reducing the energy cost.

The expanded beads of the present invention can also be produced into an expanded beads-molded article according to a continuous molding method. In the continuous in-mold molding method, an expanded beads-molded article is obtained using a molding apparatus that is known per se, that is, a molding apparatus having a hopper for expanded bead supply, and a passageway equipped with continuously moving endless belts along the top and bottom of the passageway, while the passageway includes a heating region and a cooling region. The expanded beads-molded article is obtained by increasing the internal pressure of the expanded beads as necessary, subsequently supplying the expanded beads continuously between the continuously moving belts along the top and bottom of the passageway, expanding and fuse-bonding the expanded beads with each other, during pass through the supplying region the saturated steam (heating region), subsequently allowing the expanded beads to pass through the cooling region to cool the expanded beads to obtain a molded article, removing the molded article thus obtained from the passageway, and then sequentially cutting the molded article to an appropriate size. Such a continuous in-mold molding method is described in, for example, JP-A Nos. 9-104026, 9-104027, and 10-180888.

Furthermore, the expanded beads-molded article obtained by using the expanded beads of the present invention is such that the open cell content measured according to Procedure C of ASTM-D2856-70 is preferably 40% or less, more preferably 30% or less, and particularly preferably 25% or less. A molded article having a smaller open cell content may have superior mechanical strength.

In the expanded beads-molded article obtained by using the expanded beads of the present invention, a surface decorative material can be laminated and integrated on at least a portion of the surface of the expanded beads-molded article. The method for producing such a laminated composite type article through in-mold molding of expanded beads is described in detail in, for example, U.S. Pat. Nos. 5,928,776, 6,096,417, 6,033,770, 5,474,841, EP No. 477476, WO 98/34770, WO 98/00287, and Japanese Patent No. 3092227.

Inside the expanded beads-molded article obtained by the present invention, an insert material can be combined and integrated by embedding the entirety or a part of the insert material. The method for producing such an inserted composite type article through in-mold molding of expanded beads is described in detail in, for example, U.S. Pat. Nos. 6,033,770, 5,474,841, JP-A No. 59-127714, and Japanese Patent No. 3092227.

EXAMPLES

Hereinafter, the present invention will be described in detail by way of Examples and Comparative Examples.

The type of the polypropylene resin used in Examples, Comparative Examples and Reference Examples, the heat quantity of melting (J/g) of the resin as measured by a differential scanning calorimetric analysis, the tensile modulus (MPa) and the like are presented in Table 1.

TABLE 1

| | | Melting point °C. | Total heat quantity of melting J/g | Tensile modulus MPa | Remarks |
|---|---|---|---|---|---|
| Core layer resin | Resin A1 | 154.3 | 97 | 1350 | Ethylene-propylene random copolymer |
| | Resin A2 | 153.8 | 86 | 1350 | Ethylene-propylene random copolymer |
| | Resin A3 | 165.6 | 120 | 1560 | Propylene homopolymer |
| | Resin A4 | 153.5 | 93 | 1090 | Simple blend of resin A1 and resin B (weight ratio 80:20) |
| | Resin A5 | 153.7 | 95 | 1160 | Simple blend of resin A1 and resin B (weight ratio 90:10) |
| | Resin A6 | 154.1 | 93 | 1220 | Simple blend of resin A1 and resin B (weight ratio 95:5) |
| | Resin A7 | 152.0 | 90 | 1110 | Simple blend of resin A1 and resin J (weight ratio 80:20) |
| | Resin A8 | 153.3 | 95 | 1200 | Simple blend of resin A1 and resin J (weight ratio 90:10) |
| | Resin A9 | 154.1 | 92 | 1190 | Simple blend of resin A1 and resin J (weight ratio 95:5) |
| | Resin A10 | 154.2 | 99 | 1080 | Simple blend of resin A1 and resin K (weight ratio 90:10) |
| | Resin J | 134.2 | 100 | 940 | Ethylene-propylene random copolymer Metallocene homopolymerization |
| | Resin K | 132.8 | 104 | 700 | Ethylene-butene-propylene random terpolymer |
| Coating layer resin | Resin B | 142.1 | 72 | 1150 | Ethylene-propylene random copolymer |
| | Resin C | 131.5 | 60 | 620 | Ethylene-butene-propylene random terpolymer |
| | Resin D | 153.5 | 87 | 1200 | Simple blend of resin A1 and resin B (weight ratio 50:50) |
| | Resin E | 155.3 | 92 | 1250 | Simple blend of resin A1 and resin B (weight ratio 70:30) |
| | Resin F | 151.0 | 93 | 1200 | Simple blend of resin A2 and resin B (weight ratio 60:40) |
| | Resin G | 152.8 | 93 | 1250 | Simple blend of resin A2 and resin B (weight ratio 80:20) |
| | Resin H | 153.2 | 94 | 1300 | Simple blend of resin A2 and resin B (weight ratio 90:10) |
| | Resin I | 153.5 | 94 | 1300 | Simple blend of resin A2 and resin B (weight ratio 95:5) |

Examples 1 to 18

100 parts by weight of the polypropylene resins (Resin A1 to Resin A10) indicated in Table 1 (core layer resin (y) in Table 2, Table 3 and Table 4) and 0.10 parts by weight of a zinc borate powder (cell controlling agent) were supplied to an extruder, and the mixture was heated, melted and kneaded. Thus, a first molten resin for core layer formation was formed. At the same time, the polypropylene resins (Resin B to Resin G) indicated in Table 1 (coating layer resin (x) in Table 2, Table 3 and Table 4) were supplied to another extruder, and the resin was heated, melted and kneaded. Thus, a second molten resin for coating layer formation was formed.

Subsequently, the first molten resin for core layer formation and the second molten resin for coating layer formation were supplied to a co-extrusion die, and inside the die, the second molten resin was laminated on the first molten resin such that the second molten resin surrounded the strand of the first molten resin. Furthermore, the weight ratio of the coating layer indicated in Table 2 and Table 3 were calculated based on the ratio (xb/ya) of the discharge amount of the second molten resin (kg/hour) (xb) and the discharge amount of the first molten resin (kg/hour) (ya).

Subsequently, the laminated molten resin was extruded from the co-extrusion die into a strand form, and was cut to have a dimension of a diameter of about 1 mm and a length equivalent to about 1.8 times the diameter. Thus, multilayer resin beads having an average weight per bead of 1.8 mg were obtained.

The multilayer resin beads were used to produce expanded beads as described below.

100 parts by weight (1000 g) of the multilayer resin beads, 300 parts by weight of water, 0.05 parts by weight of sodium dodecyl benzenesulfonate (surfactant), 0.3 parts by weight of kaolin (dispersant), and carbon dioxide gas (blowing agent) indicated in Table 2 and Table 3 were introduced to a 5-liter autoclave, and while the mixture was stirred, the temperature was increased to a temperature lower by 5° C. than the expansion temperature indicated in Table 2 and Table 3. The system was maintained at that temperature for 15 minutes. Subsequently, one end of the autoclave was opened, and the content of the autoclave was discharged under the atmospheric pressure. Thus, expanded beads were obtained. In order to increase the calorific value of the high-temperature peak in Example 11, the retention time prior to expansion and the expansion temperature were adjusted.

Further, during the discharge of the multilayer resin beads from the autoclave, the discharge was carried out while carbon dioxide gas was supplied into the autoclave, so that the pressure inside the autoclave could be maintained at the pressure inside the autoclave immediately before the discharge.

The expanded beads thus obtained were washed with water, and were subjected to a centrifuge. Subsequently, the expanded beads were aged by leaving the beads to stand under the atmospheric pressure for 24 hours. Subsequently, the apparent density of the expanded beads and the calorific value of the high-temperature peak were measured. The results are presented in Table 2, Table 3 and Table 4.

Further, the analysis of the apparent density (g/L) of the expanded bead group, the calorific value (J/g) of the high-temperature peak of the expanded beads, and the average cell diameter was carried out according to the methods described above.

In order to observe the state of the coating layer portion of the expanded beads, multilayer resin beads in which the coating layer was colored by adding a colorant were produced, and the multilayer resin beads were foamed and expanded in the same manner as in Examples 1 to 18. The expanded beads were observed with a microscope, and it was found that the portion corresponding to the colored coating layer (shell portion of the expanded beads) was not expanded. Furthermore, the coating state of the coating layer resin was also observed. The results are presented in Table 2, Table 3 and Table 4.

The expanded beads obtained in Examples 1 to 10 and Examples 12 to 18 were used to mold expanded beads-molded articles as described below.

As the molding machine, a small-scale molding machine capable of enduring a saturated steam pressure of 0.48 MPa (G) was used. The expanded beads were filled in a mold having a molding space which measured 250 mm×200 mm×50 mm, without completely closing the mold, and with an open gap (about 5 mm) being left. Subsequently, the mold was completely closed, and air inside the mold was exhausted with steam pressure. Then, heat molding was carried out by supplying steam pressure at a pressure indicated in Table 2, Table 3 and Table 4 into the mold. After the heat molding, the molded article was cooled with water until the surface pressure of the molded article inside the mold reached 0.039 MPa (G), and then the molded article was removed from the mold. The molded article was aged at 80° C. for 24 hours, and then was cooled to room temperature. Thus, an expanded beads-molded article was obtained.

Furthermore, an internal pressure of 0.30 MPa (G) was applied to the expanded beads obtained in Example 11, and then an expanded beads-molded article was formed as described below. The same small-scale molding machine as described above, which was capable of enduring a saturated steam pressure of 0.48 MPa (G), was used. The expanded beads were filled in a mold having a molding space which measured 250 mm×200 mm×50 mm, without completely closing the mold, and with an open gap (about 5 mm) being left. Subsequently, the mold was completely closed, and air inside the mold was exhausted with steam pressure. Then, heat molding was carried out by supplying steam pressure at a pressure indicated in Table 3 into the mold. After the heat molding, the molded article was cooled with water until the surface pressure of the molded article inside the mold reached 0.039 MPa (G), and then the molded article was removed from the mold. The molded article was aged at 80° C. for 24 hours, and then was cooled to room temperature. Thus, an expanded beads-molded article was obtained.

The steam pressures (minimum molding steam pressure) used at the time of heat molding for obtaining the good articles according to the present Examples are presented in Table 2, Table 3 and Table 4.

TABLE 2

|  |  | Example 1 | Example 2 | Example 3 | Example 4 | Example 5 | Example 6 |
|---|---|---|---|---|---|---|---|
| Core layer resin: y |  | — | Resin A1 | Resin A1 | Resin A1 | Resin A1 | Resin A1 | Resin A1 |
| Partial calorific value (Ec) of core layer resin of area under temperature range of from core layer melting point to higher temperatures | J/g | 26.4 | 26.4 | 26.4 | 26.4 | 26.4 | 26.4 |
| Coating layer resin: x |  | — | Resin B | Resin B | Resin B | Resin B | Resin B | Resin C |
| Ratio (Es/Ec) of partial calorific value (Es) of coating layer resin of area under temperature range of from core layer resin melting point to higher temperatures, and partial calorific value (Ec) of core layer resin of area under temperature range of from core layer resin melting point to higher temperatures |  | — | 0 | 0 | 0 | 0 | 0 | 0 |
| Ratio of second molten resin for coating layer formation (xb/ya) |  | — | 0.003 | 0.005 | 0.010 | 0.030 | 0.030 *2) 0.010 + 0.050 *1) | 0.010 |
| Coating layer thickness of multilayer resin beads | μm | 1.68 | 2.81 | 5.61 | 16.8 | 5.61 + 28.1 *1) | 5.61 |
| Bead weight | mg | 1.8 | 1.8 | 1.8 | 1.8 | 1.8 | 1.8 |
| Carbon dioxide gas (expanding agent) | Parts by weight | 4.0 | 4.0 | 4.0 | 4.0 | — | 4.0 |
| Expansion temperature | ° C. | 160.8 | 160.8 | 160.5 | 160.5 | — | 160.5 |
| Calorific value of high temperature peak | J/g | 23 | 24 | 27 | 24 | 25.1 *2) | 27 |
| Apparent density of multilayer resin beads | g/L | 82 | 81 | 67 | 65 | 67 | 67 |
| L/D of expanded beads | — | 1.0 | 1.0 | 1.0 | 1.0 | 1.0 | 1.0 |
| Coating layer portion thickness of expanded beads | μm | 0.21 | 0.35 | 0.62 | 1.81 | 1.82 *2) (0.60 + 3.04) *1) | 0.62 |
| State of surface coating *3) | — | Partially coated | Partially coated | Circumference completely coated | Circumference completely coated | Circumference completely coated | Circumference completely coated |
| Internal pressure at the time of molding | MPa(G) | 0 | 0 | 0 | 0 | 0 | 0 |
| Minimum molding steam pressure | MPa(G) | 0.42 | 0.40 | 0.40 | 0.40 | 0.38 | 0.40 |
| Density (A) of molded article | g/L | 54.2 | 56.8 | 47.0 | 42.9 | 45.2 | 52.1 |
| Appearance of expanded beads-molded article *4) | — | ○ | ○ | ○ | ○ | ○ | ○ |
| Micro thermomechanical analysis of core layer portion (Td) | ° C. | 159 | 159 | 159 | 159 | Not measured | 159 |

TABLE 2-continued

|  |  | Example 1 | Example 2 | Example 3 | Example 4 | Example 5 | Example 6 |
|---|---|---|---|---|---|---|---|
| Micro thermomechanical analysis of coating layer portion (Tca) *5) | °C. | 154 | 136 | 141 | 136 | Not measured | 132 |
| Compressive stress value (B) at 50% strain | kPa | 650 | 677 | 541 | 474 | 500 | 607 |
| Determination of compressive stress value at 50% strain based on expression (9) *6) | — | ○ | ○ | ○ | ○ | ○ | ○ |

TABLE 3

|  |  | Example 7 | Example 8 | Example 9 | Example 10 | Example 11 |
|---|---|---|---|---|---|---|
| Core layer resin: y | — | Resin A1 | Resin A2 | Resin A1 | Resin A2 | Resin A3 |
| Partial calorific value (Ec) of core layer resin of area under temperature range of from core layer melting point to higher temperatures | J/g | 26.4 | 22.3 | 26.4 | 22.3 | 34.5 |
| Coating layer resin: x | — | Resin D | Resin F | Resin E | Resin G | Resin B |
| Ratio (Es/Ec) of partial calorific value (Es) of coating layer resin of area under temperature range of from core layer resin melting point to higher temperatures, and partial calorific value (Ec) of core layer resin of area under temperature range of from core layer resin melting point to higher temperatures | — | 0.28 | 0.36 | 0.45 | 0.65 | 0 |
| Ratio of second molten resin for coating layer formation (xb/ya) | — | 0.010 | 0.010 | 0.010 | 0.010 | 0.010 |
| Coating layer thickness of multilayer resin beads | μm | 5.61 | 5.61 | 5.61 | 5.61 | 5.61 |
| Bead weight | mg | 1.8 | 1.8 | 1.8 | 1.8 | 1.8 |
| Carbon dioxide gas (expanding agent) | Parts by weight | 4.0 | 4.0 | 4.0 | 3.5 | 4.0 |
| Expansion temperature | °C. | 160.9 | 160.5 | 160.6 | 160.8 | 167.0 |
| Calorific value of high temperature peak | J/g | 23 | 24 | 25 | 25 | 48 |
| Apparent density of multilayer resin beads | g/L | 72 | 66 | 66 | 69 | 70 |
| L/D of expanded beads | — | 1.0 | 1.0 | 1.0 | 1.0 | 1.0 |
| Coating layer portion thickness of expanded beads | μm | 0.65 | 0.61 | 0.61 | 0.63 | 0.64 |
| State of surface coating *3) | — | Circumference completely coated | Circumference completely coated | Circumference completely coated | Circumference completely coated | Circumference completely coated |
| Internal pressure at the time of molding | MPa(G) | 0 | 0 | 0 | 0 | 0.30 |
| Minimum molding steam pressure | MPa(G) | 0.38 | 0.40 | 0.42 | 0.42 | 0.43 |
| Density (A) of molded article | g/L | 51.7 | 44.7 | 51.3 | 49.4 | 45.0 |
| Appearance of expanded beads-molded article *4) | — | ○ | ○ | ○ | ○ | Δ |
| Micro thermomechanical analysis of core layer portion (Td) | °C. | 159 | 159 | 159 | 159 | 169 |
| Micro thermomechanical analysis of coating layer portion (Tca) *5) | °C. | 144 | 144 | 143 | 146 | 136 |
| Compressive stress value (B) at 50% strain | kPa | 600 | 503 | 603 | 577 | 530 |
| Determination of compressive stress value at 50% strain based on expression (9) *6) | — | ○ | ○ | ○ | ○ | ○ |

TABLE 4

|  |  | Example 12 | Example 13 | Example 14 | Example 15 | Example 16 | Example 17 | Example 18 |
|---|---|---|---|---|---|---|---|---|
| Core layer resin: y | — | Resin A4 | Resin A5 | Resin A6 | Resin A7 | Resin A8 | Resin A9 | Resin A10 |
| Partial calorific value (Ec) of core layer resin of area under temperature range of from core layer melting point to higher temperatures | J/g | 18.6 | 21.1 | 21.2 | 23.0 | 21.7 | 20.4 | 16.4 |
| Coating layer resin: x | — | Resin B | Resin B | Resin B | Resin B | Resin B | Resin B | Resin B |
| Ratio (Es/Ec) of partial calorific value (Es) of coating layer resin of area under temperature range of from core layer resin melting point to higher temperatures, and partial calorific value (Ec) of core layer resin of area under temperature range of from core layer resin melting point to higher temperatures | — | 0 | 0 | 0 | 0 | 0 | 0 | 0 |
| Ratio of second molten resin for coating layer formation (xb/ya) | — | 0.010 | 0.010 | 0.010 | 0.010 | 0.010 | 0.010 | 0.010 |
| Coating layer thickness of multilayer resin beads | μm | 5.61 | 5.61 | 5.61 | 5.61 | 5.61 | 5.61 | 5.61 |
| Bead weight | mg | 1.8 | 1.8 | 1.8 | 1.8 | 1.8 | 1.8 | 1.8 |
| Carbon dioxide gas (expanding agent) | Parts by weight | 4.0 | 4.0 | 4.0 | 4.0 | 4.0 | 4.0 | 4.0 |

TABLE 4-continued

|  |  | Example 12 | Example 13 | Example 14 | Example 15 | Example 16 | Example 17 | Example 18 |
|---|---|---|---|---|---|---|---|---|
| Expansion temperature | °C. | 159.8 | 160.5 | 160.0 | 159.9 | 159.9 | 159.5 | 160.4 |
| Calorific value of high temperature peak | J/g | 23 | 25 | 20 | 25 | 22 | 24 | 22 |
| Apparent density of multilayer resin beads | g/L | 73 | 76 | 67 | 70 | 76 | 67 | 66 |
| L/D of expanded beads | — | 1.0 | 1.0 | 1.0 | 1.0 | 1.0 | 1.0 | 1.0 |
| Coating layer portion thickness of expanded beads | μm | 0.65 | 0.67 | 0.62 | 0.64 | 0.67 | 0.62 | 0.62 |
| State of surface coating *3) | — | Circumference completely coated | Circumference completely coated | Circumference completely coated | Circumference completely coated | Circumference completely coated | Circumference completely coated | Circumference completely coated |
| Internal pressure at the time of molding | MPa(G) | 0 | 0 | 0 | 0 | 0 | 0 | 0 |
| Minimum molding steam pressure | MPa(G) | 0.36 | 0.36 | 0.36 | 0.36 | 0.36 | 0.36 | 0.36 |
| Density (A) of molded article | g/L | 51.3 | 53.4 | 46.0 | 52.9 | 48.5 | 45.9 | 47.0 |
| Appearance of expanded beads-molded article *4) | — | ○ | ○ | ○ | ○ | ○ | ○ | ○ |
| Micro thermomechanical analysis of core layer portion (Td) | °C. | 156 | 159 | 159 | 157 | 159 | 159 | 157 |
| Micro thermomechanical analysis of coating layer portion (Tca) *5) | °C. | 136 | 136 | 136 | 136 | 136 | 136 | 136 |
| Compressive stress value (B) at 50% strain | kPa | 581 | 638 | 520 | 618 | 561 | 522 | 534 |
| Determination of compressive stress value at 50% strain based on expression (9) *6) | — | ○ | ○ | ○ | ○ | ○ | ○ | ○ |

In regard to Table 2, Table 3 and Table 4,

*1) 50% by weight of expanded beads having a coating layer ratio of 5% by weight, and 50% by weight of expanded beads having a coating layer ratio of 1% by weight are mixed.

*2) Average value of two kinds of expanded beads.

*3) Surface state determined by observing the surfaces of expanded beads after coloring the coating layer resin.

*4) The number of voids between expanded beads in an area of 100 expanded beads. Voids between expanded beads, 50 or more sites: Δ, fewer than 50 sites: ○

*5) Average value of temperatures at 50 sites with a lower temperature of the inflection point on the lower temperature side for the core of 100 measured surfaces of an expanded beads-molded article

*6) Determination in the case of satisfying the expression (9): ○, determination in the case of not satisfying the expression (9): x The compressive strength and apparent density of the expanded beads-molded articles obtained in Examples 1 to 18, and the μTA analysis results for the coating layer portion and the core layer portion of the expanded beads constituting the expanded beads-molded article are presented in Table 2, Table 3 and Table 4.

As shown in Table 2, Table 3 and Table 4, the steam pressure (minimum molding steam pressure) under the heat molding conditions in Examples 1, 9 and 10 was 0.42 MPa (G), and the steam pressure under the heat molding conditions in Examples 2 to 8 was 0.40 MPa (G) or less. Particularly, in Examples 5 and 7, the steam pressure under the heating conditions was 0.38 MPa (G), and the steam pressure under the heat molding conditions in Examples 12 to 18 was 0.36 MPa (G). From these results, it can be seen that the expanded beads obtained in the Examples are expanded beads that can be in-mold molded at low pressure, even though most of the bead is composed of high melting point polypropylene resins.

Furthermore, the expanded beads of Example 11 formed an expanded beads-molded article having a particularly excellent compressive strength, due to the large calorific value of the high-temperature peak, even though the steam pressure at the time of in-mold molding (minimum molding steam pressure) was 0.43 MPa (G).

Furthermore, the expanded beads-molded articles obtained in Examples 1 to 18 had a fusion-bonding rate of the expanded beads of 50% or greater, and had excellent fusibility of the expanded beads with each other.

The measurement of the compressive stress of the expanded beads-molded article, the measurement of the apparent density (A) of the expanded beads-molded article, and the temperature of the inflection point obtained by a micro thermomechanical analysis of the coating layer portion and the core layer portion of the expanded beads constituting the expanded beads-molded article were carried out according to the methods described above.

The multilayer expanded beads of Example 1 were partially coated expanded beads in which the circumferential surfaces of the expanded beads were not entirely coated by the coating layer but were partially coated. The expanded beads-molded article obtained from the multilayer expanded beads of Example 1 tended to have an increased inflection point average temperature (Tca) as compared with the expanded beads-molded articles of Examples 2 to 4. However, the expanded beads-molded article of Example 1 satisfied the expression (10), had a satisfactory appearance, and had a compressive strength such that the compressive stress value at 50% compression of the expanded beads-molded article satisfied the expression (9).

The multilayer expanded beads of Example 2 were such that the circumferential surfaces of the beads were not entirely coated by the coating layer but were partially coated. However, for the expanded beads-molded article obtained from the multilayer expanded beads, the inflection point average temperature (Tca) satisfied the expression (10) and was equivalent to that of the expanded beads of Example 4 having the circumferential surfaces entirely coated. On the other hand, the expanded beads-molded article of Example 2 had a satisfactory appearance, and had a compressive strength such that the compressive stress value at 50% compression of the expanded beads-molded article satisfied the expression (9).

The multilayer expanded beads of Examples 3 and 4 had a coating state in which the coating layer resin coated the entire circumferential surfaces of the beads, and the molding steam pressure was 0.40 MPa, which was a molding steam pressure equivalent to Examples 2 to 4.

The inflection point average temperature (Tca) satisfied the expression (10), and the appearance was satisfactory. The expanded beads-molded articles had a compressive strength such that the compressive stress values at 50% compression of the expanded beads-molded articles satisfied the expression (9).

In Example 5, multilayer expanded beads having an average value of the coating layer resin thickness of 0.60 μm and multilayer expanded beads having an average value of 3.04 μm were mixed at a proportion of 50% by weight each, and molding was carried out.

The average of the coating layer thickness was close to the value of Example 4, but the molding steam pressure had a slightly lower value than Example 4. Furthermore, the inflection point average temperature (Tca) satisfied the expression (10), and the external appearance was satisfactory. The expanded beads-molded article had a compressive strength such that the compressive stress value at 50% compression of the expanded beads-molded article satisfied the expression (9).

The multilayer expanded beads of Example 6 were such that the average value of the coating layer resin thickness was 0.62 μm, which was almost equal to that of Example 3. However, the polypropylene resin used as the raw material for the coating layer was a polypropylene resin having a lower melting point than Example 3, and having a tensile modulus of 620 MPa. The molding steam pressure was 0.40 MPa (G).

Further the inflection point average temperature (Tca) satisfied the expression (10), and the appearance was satisfactory. The expanded beads-molded article had a compressive strength such that the compressive stress value at 50% compression of the expanded beads-molded article satisfied the expression (9).

The multilayer expanded beads of Example 7 were such that the average value of the coating layer resin thickness was 0.65 μm, and the melting point of the polypropylene resin used as the raw material of the coating layer was 153.5° C., which was higher by +0.8° C. with respect to the melting point of the polypropylene resin used as the raw material of the core layer. On the other hand, the ratio Es/Ec was 0.28 and satisfied the expression (2). The molding steam pressure was 0.38 MPa (G).

The inflection point average temperature (Tca) satisfied the expression (10), and the appearance was satisfactory. The expanded beads-molded article had a compressive strength such that the compressive stress value at 50% compression of the expanded beads-molded article satisfied the expression (9).

The multilayer expanded beads of Example 8 were such that the average value of the coating layer resin thickness was 0.61 μm, which was almost equal to that of Examples 3 and 6. However, the melting point of the polypropylene resin used as the raw material of the coating layer was 151.0° C., which was lower by −2.8° C. with respect to the melting point of the polypropylene resin used as the raw material of the core layer. On the other hand, the ratio Es/Ec was 0.36 and satisfied the expression (2). The molding steam pressure was 0.40 MPa (G).

The inflection point average temperature (Tca) satisfied the expression (10), and the appearance was satisfactory. The expanded beads-molded article had a compressive strength such that the compressive stress value at 50% compression of the expanded beads-molded article satisfied the expression (9).

The multilayer expanded beads of Example 9 were such that the average value of the coating layer resin thickness was 0.61 μm, which was almost equal to that of Examples 3 and 6. However, the melting point of the polypropylene resin used as the raw material of the coating layer was 155.3° C., which was higher by +1.0° C. with respect to the melting point of the polypropylene resin used as the raw material of the core layer. On the other hand, the ratio Es/Ec was 0.45 and satisfied the expression (2). The molding steam pressure was 0.42 MPa (G).

The inflection point average temperature (Tca) satisfied the expression (10), and the appearance was satisfactory. The expanded beads-molded article had a compressive strength such that the compressive stress value at 50% compression of the expanded beads-molded article satisfied the expression (9).

The multilayer expanded beads of Example 10 were such that the average value of the coating layer resin thickness was 0.63 μm. The melting point of the polypropylene resin used as the raw material of the coating layer was 152.8° C., which was lower by −1.0° C. with respect to the melting point of the polypropylene resin used as the raw material of the core layer. On the other hand, the ratio Es/Ec was 0.65 and satisfied the expression (2). The molding steam pressure was 0.42 MPa (G).

Further, the inflection point average temperature (Tca) satisfied the expression (10), and the appearance was satisfactory. The expanded beads-molded article had a compressive strength such that the compressive stress value at 50% compression of the expanded beads-molded article satisfied the expression (9).

The multilayer expanded beads of Example 11 used a propylene rein having a particularly high tensile modulus as the polypropylene resin of the core layer of the multilayer resin beads. Furthermore, since the calorific value of the high-temperature peak of the expanded beads thus obtained was 48 J/g, the secondary expandability was poor. However, when pressure molding was carried out by applying an internal pressure to the expanded beads to enhance the secondary expandability, the appearance had many voids between the expanded beads, but an expanded beads-molded article was obtained. The molded article thus obtained exhibited a particularly excellent compressive strength.

Examples 12 to 18 are examples in which a propylene resin having a lower melting point than the principal polypropylene resin forming the core layer was incorporated into the core layer resin. In Examples 12 and 15, the ratio (weight ratio) between the principal high melting point resin and the low melting point resin was 80:20, while Examples 13, 16 and 18 had a ratio of 90:10, and Examples 14 and 17 had a ratio of 95:5. For all of the Examples, the steam pressure at the time of molding was low, such as 0.36 MPa (G). The inflection point average temperature (Tca) satisfied the expression (10), and the appearance was satisfactory. The expanded beads-molded article had a compressive strength such that the compressive stress value at 50% compression of the expanded beads-molded article satisfied the expression (9).

Comparative Examples 1 to 6 and Reference Examples 1 to 3

Resin beads were obtained using the polypropylene resins indicated in Table 1. In Comparative Example 1, Comparative Examples 5 and 6, and Reference Examples 1 to 3, conventional single layer expanded beads having no coating layer were used. In Reference Examples 2 and 3, a propylene resin having a lower melting point than the principal polypropylene resin forming the core layer was incorporated into the core layer resin. Comparative Examples 2 to 4 were multilayer resin beads. In Comparative Examples 2 to 4, multilayer resin beads were produced in the same manner as in Example 1, except that the base resins of the core layer and the coating layer were changed, and also, the ratio of the resin for coating layer formation was changed.

In Reference Examples 1 to 3 and Comparative Examples 1 to 6, expanded beads were produced using single layer resin beads or multilayer resin beads, and in the same manner as in Example 1 in terms of the amount of addition of carbon dioxide gas, the expansion temperature and the like.

The expanded beads thus obtained were washed with water and were subjected to a centrifuge in the same manner as in the Examples. Subsequently, the expanded beads were aged by leaving the beads to stand under the atmospheric pressure for 24 hours, and then the apparent density of the expanded beads, the calorific value of the high-temperature peak and the like were measured. The results are presented in Table 5 and Table 6.

TABLE 5

|  |  | Comparative Example 1 | Comparative Example 2 | Comparative Example 3 | Comparative Example 4 | Comparative Example 5 | Comparative Example 6 |
|---|---|---|---|---|---|---|---|
| Core layer resin: y | — | Resin A1 | Resin A1 | Resin A2 | Resin A2 | Resin A4 | Resin A7 |
| Partial calorific value (Ec) of core layer resin of area under temperature range of from core layer melting point to higher temperatures | J/g | 26.4 | 26.4 | 22.3 | 22.3 | 18.6 | 23.0 |
| Coating layer resin: x | — | — | — | Resin B | Resin H | Resin I | — | — |
| Ratio (Es/Ec) of partial calorific value (Es) of coating layer resin of area under temperature range of from core layer resin melting point to higher temperatures, and partial calorific value (Ec) of core layer resin of area under temperature range of from core layer resin melting point to higher temperatures | — | 0 | 0 | 0.77 | 0.86 | 0 | 0 |
| Ratio of second molten resin for coating layer formation (xb/ya) | — | 0 | 0.050 | 0.010 | 0.010 | 0 | 0 |
| Coating layer thickness of multilayer resin beads | μm | 0 | 28.1 | 5.61 | 5.61 | 0 | 0 |
| Bead weight | mg | 1.8 | 1.8 | 1.8 | 1.8 | 1.8 | 1.8 |
| Carbon dioxide gas (expanding agent) | Parts by weight | 4.0 | 4.0 | 3.5 | 3.6 | 4.0 | 4.0 |
| Expansion temperature | °C. | 160.7 | 160.7 | 160.8 | 160.8 | 159.8 | 159.9 |
| Calorific value of high temperature peak | J/g | 22 | 23 | 26 | 25 | 23 | 25 |
| Apparent density of multilayer resin beads | g/L | 64 | 68 | 78 | 77 | 73 | 70 |
| L/D of expanded beads | — | 1.0 | 1.0 | 1.0 | 1.1 | 1.0 | 1.0 |
| Coating layer portion thickness of expanded beads | μm | 0 | 3.12 | 0.68 | 0.67 | 0 | 0 |
| State of surface coating *3) | — | None | Circumference completely coated | Circumference completely coated | Circumference completely coated | None | None |
| Internal pressure at the time of molding | MPa(G) | 0 | 0 | 0 | 0 | 0 | 0 |
| Minimum molding steam pressure | MPa(G) | 0.50 | 0.38 | 0.44 | 0.46 | 0.50 | 0.50 |
| Density (A) of molded article | g/L | 42.0 | 43.3 | 52.9 | 53.9 | 47.0 | 50.0 |
| Appearance of expanded beads-molded article *4) | — | ○ | ○ | ○ | ○ | ○ | ○ |
| Micro thermomechanical analysis of core layer portion (Td) | °C. | 159 | 159 | 159 | 159 | 156 | 157 |
| Micro thermomechanical analysis of coating layer portion (Tca) *5) | °C. | 159 | 125 | 153 | 153 | 156 | 157 |
| Compressive stress value (B) at 50% strain | kPa | 471 | 467 | 643 | 658 | 541 | 585 |
| Determination of compressive stress value at 50% strain based on expression (9) *6) | — | ○ | x | ○ | ○ | ○ | ○ |

TABLE 6

|  |  | Reference Example 1 | Reference Example 2 | Reference Example 3 |
|---|---|---|---|---|
| Core layer resin: y | — | Resin A1 | Resin A4 | Resin A7 |
| Partial calorific value (Ec) of core layer resin of area under temperature range of from core layer melting point to higher temperatures | J/g | 26.4 | 18.6 | 23.0 |
| Coating layer resin: x | — | — | — | — |
| Ratio (Es/Ec) of partial calorific value (Es) of coating layer resin of area under temperature range of from core layer resin melting point to higher temperatures, and partial calorific value (Ec) of core layer resin of area under temperature range of from core layer resin melting point to higher temperatures | — | 0 | 0 | 0 |
| Ratio of second molten resin for coating layer formation (xb/ya) | — | 0 | 0 | 0 |
| Coating layer thickness of multilayer resin beads | μm | 0 | 0 | 0 |
| Bead weight | mg | 1.8 | 1.8 | 1.8 |
| Carbon dioxide gas (expanding agent) | Parts by weight | 4.0 | 4.0 | 4.0 |
| Expansion temperature | °C. | 160.7 | 159.8 | 159.9 |
| Calorific value of high temperature peak | J/g | 22 | 23 | 25 |

TABLE 6-continued

|  |  | Reference Example 1 | Reference Example 2 | Reference Example 3 |
|---|---|---|---|---|
| Apparent density of multilayer resin beads | g/L | 64 | 73 | 70 |
| L/D of expanded beads | — | 1.0 | 1.0 | 1.0 |
| Coating layer portion thickness of expanded beads | μm | 0 | 0 | 0 |
| State of surface coating *3 | — | None | None | None |
| Internal pressure at the time of molding | MPa(G) | 0 | 0 | 0 |
| Minimum molding steam pressure | MPa(G) | 0.42 | 0.42 | 0.42 |
| Density (A) of molded article | g/L | Not formed | Not formed | Not formed |
| Appearance of expanded beads-molded article *4 | — | — | — | — |
| Micro thermomechanical analysis of core layer portion (Td) | °C. | 159 | 156 | 157 |
| Micro thermomechanical analysis of coating layer portion (Tca) *5 | °C. | 159 | 156 | 157 |
| Compressive stress value (B) at 50% strain | kPa | Not measured | Not measured | Not measured |
| Determination of compressive stress value at 50% strain based on expression (9) *6 | — | x | x | x |

Heat molding was carried out in the same manner as in Example 1, using the expanded beads of Reference Examples 1 to 3. As a result, in the Reference Examples, the expanded beads were not fuse-bonded with each other when the mold was opened after molding, and expanded beads-molded articles were not obtained.

Comparative Example 1 is an example of carrying out heat molding in the same manner as in Reference Example 1, except that the same expanded beads as in Reference Example 1 were used, and the molding vapor pressure was changed. As a result, in Comparative Example 1, an expanded beads-molded article could be obtained when the minimum molding steam pressure was 0.50 MPa (G). Further, the molded article obtained from the expanded beads of Comparative Example 1 was such that the inflection point average temperature (Tca) could not satisfy the expression (10).

In Comparative Examples 2 to 6, expanded beads-molded articles were obtained by carrying out heat molding in the same manner as in Example 1.

In the expanded beads of Comparative Example 2, the average value of the coating layer resin thickness was 3.12 μm, which was larger than that of the expanded beads of Example 3. The molding steam pressure at the time of in-mold molding was as low as 0.38 MPa (G). On the other hand, although the inflection point average temperature (Tca) satisfied the expression (10), the compressive stress value at 50% compression of the expanded beads-molded article could not satisfy the expression (9), and the compressive strength was insufficient.

In the multilayer expanded beads of Comparative Example 3, the average value of the coating layer resin thickness was 0.68 μm, and the melting point of the polypropylene resin used as the raw material of the coating layer was 153.2° C., which was lower by −0.6° C. with respect to the melting point of the polypropylene resin used as the raw material of the core layer. On the other hand, the ratio Es/Ec was 0.77, and could not satisfy the expression (2). An expanded beads-molded article was obtained when the molding steam pressure was 0.44 MPa (G), but the steam pressure was higher as compared with the expanded beads of equivalent Examples. Furthermore, the inflection point average temperature (Tca) could not satisfy the expression (10). On the other hand, the appearance was satisfactory, and the expanded beads-molded article had a compressive strength such that the compressive stress value at 50% compression of the expanded beads-molded article satisfied the expression (9).

In the multilayer expanded beads of Comparative Example 4, the average value of the coating layer resin thickness was 0.67 μm, and the melting point of the polypropylene resin used as the raw material of the coating layer was 153.3° C., which was lower by −0.3° C. with respect to the melting point of the polypropylene resin used as the raw material of the core layer. On the other hand, the ratio Es/Ec was 0.86, and could not satisfy the expression (2). An expanded beads-molded article was obtained when the molding steam pressure was 0.44 MPa (G), but the steam pressure was higher as compared with the expanded beads of equivalent Examples. Furthermore, the inflection point average temperature (Tca) could not satisfy the expression (10). On the other hand, the appearance was satisfactory, and the expanded beads-molded article had a compressive strength such that the compressive stress value at 50% compression of the expanded beads-molded article satisfied the expression (9).

Industrial Applicability

The expanded polypropylene resin beads according to the present invention can be heat molded at a steam pressure lower than the steam pressure required in the heat molding of conventional expanded polypropylene resin beads, have sufficient rigidity without setting the calorific value of the high-temperature peak of the expanded beads to be large or without employing a pressure molding method, and can give an expanded beads-molded article having excellent heat resistance. The expanded beads of the present invention can provide an expanded beads-molded article which is suitable as an energy absorbing material such as a bumper for automobiles, and exhibits excellent energy absorption and excellent compressive strength.

Description of Reference Numerals a Intrinsic peak of DSC endothermic curve peaks
b High temperature peak of DSC endothermic curve peaks
α Point corresponding to 80° C. on DSC curve
β Fusion completion point
γ Valley between intrinsic peak a and high temperature peak b of DSC endothermic curve peaks
σ Intersection point between the straight line parallel to the valley and the ordinate, and the base line α-β
T Melting end temperature in the first time DSC endothermic curve
Tm Melting point
Te Melting end temperature
BL Base line

The invention claimed is:

1. Expanded polypropylene resin beads, which are multilayer resin expanded beads formed by foaming and expanding multilayer resin beads comprising:

a core layer formed of a polypropylene resin, and a coating layer formed of another polypropylene resin that is different from the polypropylene resin forming the core layer, the another polypropylene resin being capable of being molded at a steam pressure lower than a molding steam pressure of equivalent single layer expanded beads formed by foaming and expanding a single layer of resin beads formed by the polypropylene resin of the core layer, wherein a resin weight ratio of the coating layer and the core layer (weight of the another polypropylene resin/weight of the polypropylene resin) in the multilayer resin beads is from 0.001 to 0.040, and an average value of a thickness of the coating layer of the expanded polypropylene beads is from 0.1 µm to 3.0 µm.

2. The expanded polypropylene resin beads according to claim 1, wherein a tensile modulus of the polypropylene resin forming the core layer in the multilayer resin beads is 1000 MPa or greater.

3. The expanded polypropylene resin beads according to claim 1, wherein a tensile modulus of the polypropylene resin forming the core layer in the multilayer resin beads is 1200 MPa or greater.

4. The expanded polypropylene resin beads according to claim 1, wherein a melting point of the another polypropylene resin forming the coating layer of the multilayer resin beads is lower than a melting point of the polypropylene resin forming the core layer.

5. The expanded polypropylene resin beads according to claim 1, wherein a melting initiation temperature of the another polypropylene resin forming the coating layer of the multilayer resin beads is lower than a melting initiation temperature of the polypropylene resin forming the core layer.

6. The expanded polypropylene resin beads according to claim 1, wherein a heat quantity of melting of the another polypropylene resin forming the coating layer of the multilayer resin beads is smaller than a heat quantity of melting of the polypropylene resin forming the core layer.

7. The expanded polypropylene resin beads according to claim 1, wherein a tensile yield strength of the polypropylene resin forming the core layer of the multilayer resin beads is at least 31 MPa.

8. The expanded polypropylene resin beads according to claim 1, wherein the polypropylene resin forming the core layer of the multilayer resin beads is one or a mixture of two or more resins selected from a propylene homopolymer, and a copolymer of propylene and another co-monomer containing 60 mol% or more of a propylene component unit.

9. The expanded polypropylene resin beads according to claim 1, wherein a DSC endothermic curve obtained by a heat flux differential scanning calorimetric analysis of the expanded polypropylene resin beads, exhibits an endothermic curve peak intrinsic to the polypropylene resin and the another polypropylene resin, and an endothermic curve peak on a higher temperature side than the foregoing endothermic curve peak, and a calorific value of the endothermic curve peak on the higher temperature side is from 5 J/g to 40 J/g.

10. The expanded polypropylene resin beads according to claim 1, wherein a DSC endothermic curve obtained by a heat flux differential scanning calorimetric analysis of the expanded polypropylene resin beads, exhibits an endothermic curve peak intrinsic to the polypropylene resin and the another polypropylene resin, and an endothermic curve peak on a higher temperature side than the foregoing endothermic curve peak, and a calorific value of the endothermic curve peak on the higher temperature side is from 15% to 70% of the sum of the calorific values of all the endothermic curve peaks.

11. The expanded polypropylene resin beads according to claim 1, wherein in a DSC curve obtained by a heat flux differential scanning calorimetric analysis of the polypropylene resin forming the core layer and the another polypropylene resin forming the coating layer of the multilayer resin beads, a partial calorific value Ec (J/g) of an area under a temperature range of from a melting point (Ti) of the polypropylene resin forming the core layer to higher temperatures, and a partial calorific value Es (J/g) of an area under a temperature range of from a melting point (Ti) of the another polypropylene resin forming the coating layer to higher temperatures, satisfy the following expressions (1) and (2):

$$0 < Es \leq 60 \quad (1)$$

$$0 < Es/Ec \leq 0.7 \quad (2).$$

12. A polypropylene resin expanded beads-molded article formed by filling the expanded polypropylene resin beads described in claim 1 in a molding mold, and subjecting the expanded polypropylene resin beads to heat molding.

13. The expanded polypropylene resin beads according to claim 1, wherein:

the multilamultilayer resin expanded beads are formed by extruding laminated molten polypropylene resins through a co-extrusion die and cutting the laminated molten polypropylene resins, the laminated molten polypropylene resins are formed such that a molten polypropylene resin for forming the coating layer coats a molten polypropylene resin for forming the core layer inside the co-extrusion die, and a melting point of the polypropylene resin forming the coating layer is lower than a melting point of the polypropylene resin forming the core layer.

* * * * *